(12) United States Patent
Serobian

(10) Patent No.: US 8,168,578 B2
(45) Date of Patent: May 1, 2012

(54) WATER-BASED SILICONE DISPERSION CONTAINING LOW LEVEL OF SILICONE OILS

(75) Inventor: Ashot K. Serobian, Martinez, CA (US)

(73) Assignee: The Armor All/STP Products Company, Danbury, CT (US)

( * ) Notice: Subject to any disclaimer, the term of this patent is extended or adjusted under 35 U.S.C. 154(b) by 643 days.

(21) Appl. No.: 11/779,208

(22) Filed: Jul. 17, 2007

(65) Prior Publication Data

US 2007/0275867 A1 Nov. 29, 2007

Related U.S. Application Data

(63) Continuation-in-part of application No. 10/840,477, filed on May 5, 2004, now Pat. No. 7,378,382.

(51) Int. Cl.
*C11D 9/36* (2006.01)
*C11D 3/37* (2006.01)
*C11D 3/43* (2006.01)

(52) U.S. Cl. ........ 510/244; 510/243; 510/189; 510/361; 510/398; 510/417; 510/432; 510/434; 510/466

(58) Field of Classification Search .................. 510/244, 510/243, 189, 361, 398, 417, 432, 434, 466
See application file for complete search history.

(56) References Cited

U.S. PATENT DOCUMENTS

| | | | |
|---|---|---|---|
| 3,720,538 A | 3/1973 | Bergmeister et al. | |
| 4,265,663 A * | 5/1981 | Gilicinski et al. | 106/10 |
| 4,347,333 A | 8/1982 | Lohr | |
| 4,497,919 A | 2/1985 | Varga et al. | |
| 4,693,840 A * | 9/1987 | Trinh et al. | 510/242 |
| 5,227,200 A | 7/1993 | LeGrow | |
| 5,236,624 A | 8/1993 | Lepert et al. | |
| 5,433,890 A | 7/1995 | Meyer et al. | |
| 5,661,208 A | 8/1997 | Estes | |
| 5,693,704 A | 12/1997 | Estes | |
| 5,759,980 A | 6/1998 | Russo et al. | |
| 5,844,007 A | 12/1998 | Kijima et al. | |
| 5,977,050 A * | 11/1999 | Faris | 510/403 |
| 5,989,640 A | 11/1999 | Kijima et al. | |
| 6,013,323 A * | 1/2000 | Klayder et al. | 427/384 |
| 6,114,299 A | 9/2000 | Hunter et al. | |
| 6,165,479 A | 12/2000 | Wheeler | |
| 6,206,956 B1 * | 3/2001 | Muntz et al. | 106/3 |
| 6,221,433 B1 * | 4/2001 | Muntz et al. | 427/387 |
| 6,221,833 B1 * | 4/2001 | Colurciello, Jr. | 510/466 |
| 6,294,186 B1 * | 9/2001 | Beerse et al. | 424/405 |
| 6,506,715 B1 | 1/2003 | Schultz et al. | |
| 6,616,934 B1 | 9/2003 | Hill et al. | |
| 6,656,975 B1 | 12/2003 | Christiano et al. | |
| 7,074,262 B2 | 7/2006 | Huang et al. | |
| 2002/0176879 A1 * | 11/2002 | Dodd et al. | 424/405 |
| 2003/0032706 A1 * | 2/2003 | Blaine et al. | 524/386 |
| 2003/0075077 A1 * | 4/2003 | Lewis | 106/271 |
| 2003/0110976 A1 | 6/2003 | Abidh et al. | |
| 2003/0114344 A1 * | 6/2003 | White | 510/405 |
| 2003/0119917 A1 | 6/2003 | Fey et al. | |
| 2004/0016364 A1 | 1/2004 | Legrow et al. | |
| 2004/0092417 A1 * | 5/2004 | Moodycliffe et al. | 510/296 |
| 2004/0131787 A1 | 7/2004 | Fang | |
| 2007/0010607 A1 | 1/2007 | Smith et al. | |
| 2009/0162917 A1 * | 6/2009 | Harding | 435/221 |

FOREIGN PATENT DOCUMENTS

CA 1176828 * 10/1984

* cited by examiner

*Primary Examiner* — Charles Boyer
(74) *Attorney, Agent, or Firm* — Ohlandt, Greeley, Ruggiero & Perle, LLP

(57) ABSTRACT

A water-based composition for enhancing shine or gloss in an elastomeric surface is in the form of a stable aqueous dispersion having a pH of from about 6 to about 7 and containing by weight: (a) less than 10% of at least one polydiorganosiloxane fluid; (b) from about 0.02% to about 2.0% of an alkali-swellable acrylic homopolymer or copolymer crosslinked with a polyalkenyl polyether; and (c) water. In one embodiment, the composition contains less than 1% by weight of a wetting agent and has no additional surfactants, hydrotropes and emulsifying agents. The composition can be used to enhance shine or gloss in elastomeric surfaces such as rubber or vinyl, preferably automotive tires, by applying an effective amount of the composition to the surface and distributing the composition with an application implement. The composition contains less organopolysiloxane than commercial formulations but exhibits gloss-enhancing performance that is comparable or even higher than that exhibited by commercial compositions.

17 Claims, 1 Drawing Sheet

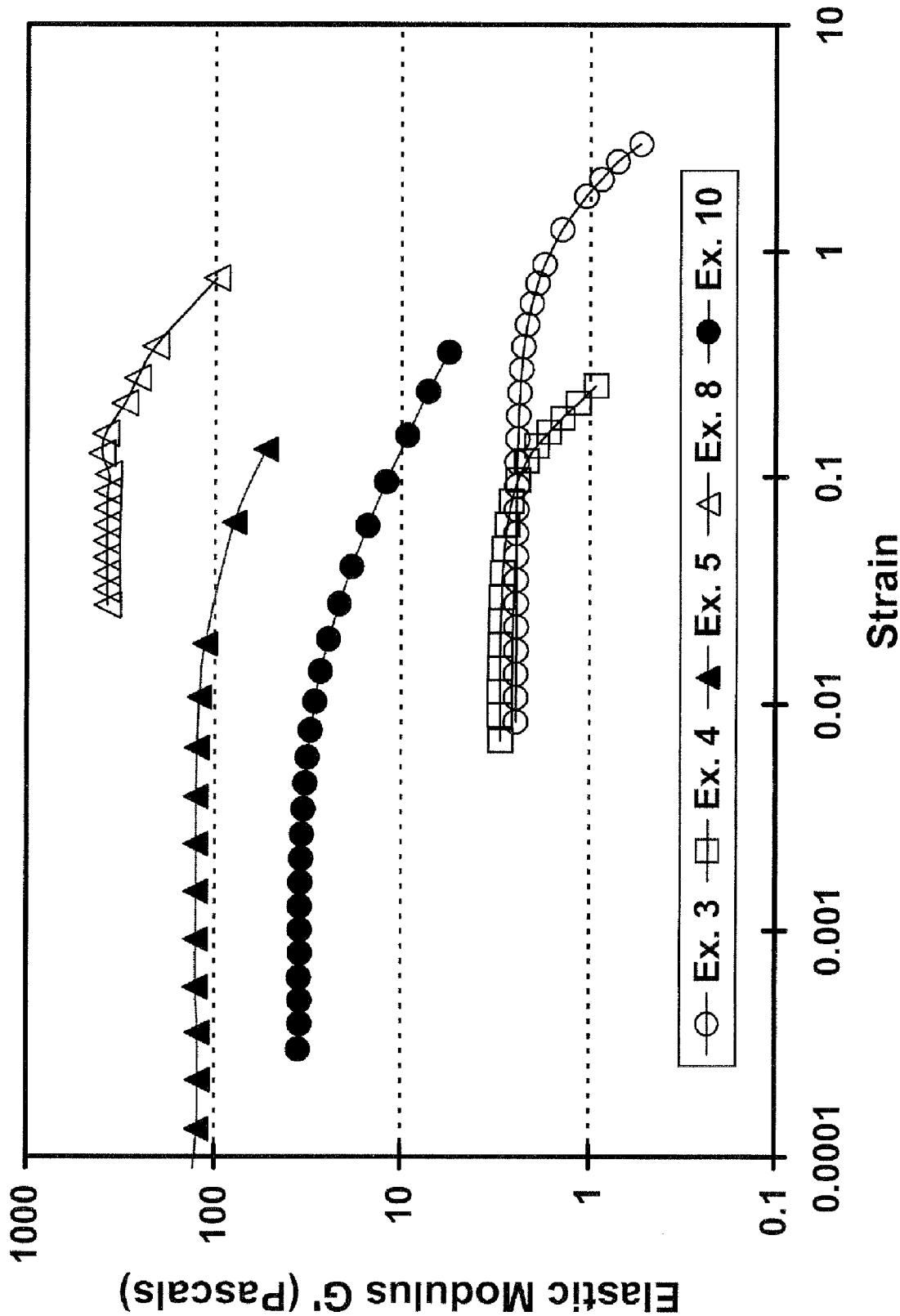

WATER-BASED SILICONE DISPERSION CONTAINING LOW LEVEL OF SILICONE OILS

This application is a Continuation-in-Part application of U.S. Ser. No. 10/840,477, filed on May 5, 2004 now U.S. Pat. No. 7,378,382.

BACKGROUND OF THE INVENTION

The present invention relates to silicone-containing compositions used to enhance shine or gloss in elastomeric surfaces. More particularly, this invention relates to an aqueous silicone-containing dispersion that contains less silicone but which results in comparable or higher shine or gloss when applied to elastomeric surfaces as compared to existing commercial formulations.

As mileage on a tire increases, the sidewall rubber surfaces often become dull and unattractive. Causes for this include, e.g., tire exposure to wind, weather, sunlight, scratching, abrasion from dirt, and other chemical and physical reactions. Prior art compositions which add gloss and restore tire appearance are disclosed, e.g., in U.S. Patent Application Publication No. 2004/0131787 (filed Nov. 23, 2003) to Fang and U.S. Patent Application Publication No. 2007/0010607 (filed Jun. 22, 2006) to Smith et al. In both of these patent applications to Fang and Smith, a compound other than a polyorganosiloxane is used in the composition to enhance gloss on an automotive tire. Fang's composition has a polyurethane component which is used to provide shine to tires. Smith's composition utilizes a polyalkene glycols or polyolefins to impart shine and gloss to tire.

Other prior art compositions for tire shine utilize siloxanes to increase gloss but they use levels of siloxane in excess of 10% and frequently greater than 20% of siloxanes to achieve desired levels of shine or gloss. Examples of references using high levels of siloxanes in tire shine compositions include: U.S. Pat. No. 5,693,704 to Estes; U.S. Pat. Nos. 6,206,956 and 6,221,433 (both to Muntz et al.); and U.S. Pat. No. 7,074,262 to Huang et al.

Given these limitations of the prior art, it is desirable to provide silicone compositions which can enhance the shine of elastomeric surfaces. In addition, the prior art references all teach that the application of tire shine compositions is done with an applicator of some kind to spread the gloss and make it appear uniform and to minimize the appearance of drips. By using a tire shine applicator much of the composition can be lost because it is retained in the absorbent applicator rather than on the treated surface. Therefore it is desirable to have a silicone composition for enhancing shine that may be sprayed on a surface in a uniform manner so that no direct touching with an applicator is necessary. It is also particularly desirable to provide silicone compositions which can enhance the shine of elastomeric surfaces while using a lower amount of silicone than commercial formulations.

It is also desirable to provide such compositions in the form of aqueous dispersions which are rheologically stable.

The use of emulsifying surfactants can pose problems relative to silicone emulsions that are used for cleaning, preserving and protecting surfaces. The level of emulsifying surfactant required in the compositions to produce storage stable emulsions are typically large in comparison to the level of surfactant required for cleaning action. Therefore, usually a substantial portion of the surfactant being used in the emulsion is merely for stability rather than for its role as a cleaning agent. Thus, some surfactant remains in the silicone phase deposited on the treated surface, resulting in undesirable characteristics both from an aesthetic and functional perspective, particularly since the surfactant employed is advantageously selected for its emulsifying capability rather than another benefit such as for wetting or cleaning purposes. Surfactant-based silicone emulsions used in surface treatment applications thus tend to suffer from undesirable characteristics, such as reduced shine, reduced coating longevity, increased susceptibility to hydration by water and/or high humidity, susceptibility to rinse-off by water, increased stickiness to the treated surface leading to dust pickup, retention of fingerprints and the like, owing to the surfactant employed as emulsifier.

Alternative approaches in the art for emulsifying silicone oils include the use of solvents and hydrotropes, alone and in combination with emulsifying surfactants, in order to achieve emulsification of the silicones. Solvents are not without their own issues, for instance, those that fall in the class of volatile organic compounds, are subject to ever increasing regulatory compliance issues. Since volatile solvents evaporate after application, the resulting films suffer less from the detrimental effects than formulations employing surfactant and emulsifiers to attain stability. However, in general, solvents are often flammable, aggressive to the substrates to which the silicone compositions are applied, require special packaging and handling requirements, and limit formulation options such as including other beneficial ingredients to the compositions that are not solvent compatible. Generally, high solvent and/or hydrotrope level and solvents and hydrotropes capable of coupling the silicone oil to water are required to achieve the emulsification of silicones. With high levels of solvent, similar detrimental effects occur in the formulations as in the formulations which rely on emulsifying surfactants, as described above.

Further, the prior art silicone emulsions achieve a high degree of stability with regards to storage conditions, temperature and time. However, the inherent stability of these emulsions can result in lowered performance due to the inability of the emulsions to break and release the emulsified silicone oils, at time of use so that the silicone oils are available to coat the intended target surface or substrate. It is desirable to coat or treat the surface with a layer of essentially pure silicone oil, or alternatively with silicone oil without significant or otherwise detrimental levels of emulsifying agents, rather than to provide a coating or layer of emulsified silicone oil with extraneous components present that not only do not contribute to the desired protective benefits, but may detract from these protective benefits.

To overcome some of the negative effects of the emulsifiers commonly employed, higher levels of the silicone oils are typically required for the formulations to exhibit the desired preserving, protecting and aesthetic benefits to treated surfaces such as those disclosed herein. In essence, a high silicone oil level, typically in amounts exceeding 20% by weight, and often greater than 30% by weight, are usually employed in practice to overcome the poorer performance of the prior art emulsions of silicone oils for these purposes.

Accordingly, there is a need in the art for improved water-based silicone dispersion compositions which will provide a beneficial cleaning, protecting, preserving and otherwise restorative effect to surfaces, as well as uniformly enhancing gloss or shine to a treated surface with low levels of silicone oils and without the need for extraneous emulsifying or solubilizing materials such as emulsifying surfactants, solvents or hydrotropes. In addition, there is a need for an improved-water based silicone dispersion which may be applied to surfaces by spraying which is self-leveling and will result in a uniform glossy coating which requires no touching or wiping of the treated surface.

SUMMARY OF THE INVENTION

As stated above, this application is a Continuation-in-Part application of U.S. Ser. No. 10/840,477, filed on May 5, 2004. U.S. Ser. No. 10/840,477 was published on Nov. 10, 2005 as U.S. Patent Application Publication No. 2005/0250668. U.S. Patent Application Publication No. 2005/0250668 is hereby incorporated by reference herein in its entirety. U.S. Patent Application Publication No. 2005/0250668 discloses rheologically stabilized aqueous dispersions of silicone oils for use in cleaning, preserving, protecting and otherwise treating a variety of surfaces, including, e.g., vinyl, leather, rubber, synthetic plastic and other elastomeric surfaces.

In one embodiment of the invention, the silicone dispersions are prepared without the need for emulsifiers such as surfactants, solvents, emulsifiers, hydrotropes and the like.

In another embodiment of the invention the silicone dispersions include low levels of wetting agents to improve the uniformity of the silicone dispersion on the treated target surface or substrate. When a wetting agent is present in the composition, typically it is at a level of less than 1% by weight of the composition and more preferably about 0.1% to about 1% and most preferably about 0.1 to about 0.5% by weight of the composition The silicone dispersion compositions contain a silicone fluid and a water-soluble and/or water-dispersible polymer, and water. The polymer can be a polymer selected from the group consisting of water-soluble and water-dispersible polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof.

The present invention provides an aqueous-based composition and a method of using same to enhance shine or gloss or impart a protective coating to elastomeric surfaces, preferably vinyl and rubber surfaces. Preferably, the aqueous-based composition of this invention is a tire shine composition for enhancing shine or gloss on a variety of surfaces, including but not limited to, vinyl, leather, rubber, synthetic plastic and other elastomeric surfaces. In one embodiment of the invention, the aqueous-based silicone dispersion composition is used add shine and protection to automotive surfaces including vinyl interior surfaces, leather interior surfaces and exterior rubber surfaces including tires, bumpers, etc.

In comparison with other automotive gloss and protectant sprays, the amount of organopolysiloxane is significantly less than competitor formulations, less than about 10% organopolysiloxane, without decreasing the amount of shine- or gloss-improving performance. For example, Meguiar's® Hot Shine™ Tire Gel and Black Magic® Tire Wet, contain at least 15-30% by weight of silicone to achieve a similar level of shine- or gloss-improving performance and the composition of the present invention. Although containing less active ingredient than comparable formulations on the market, the shine- or gloss-enhancing performance exhibited by the inventive composition may be the same or higher than that exhibited by commercial compositions.

Accordingly, one aspect of the present invention is a water-based composition for enhancing shine or gloss in an elastomeric surface comprising:

(a) less than 10% of at least one organopolysiloxane fluid;
(b) from about 0.02% to about 2.0% of an alkali-swellable acrylic polymer or copolymer; and
(c) water.

In one embodiment of the invention, the aqueous dispersion preferably exhibits a rheological Critical Strain value greater than zero and less than about 0.5 and an Elastic Modulus value greater than zero and less than about 400 Pascals.

(a) In another embodiment of the invention, the aqueous dispersion contains less than 1% of a wetting agent and has no additional surfactants, solvents, hydrotropes and other emulsifying agents.

In another embodiment of the invention, the aqueous dispersion further comprises less than 1% by weight of a wetting agent, and most preferably less than 0.5% by weight of a wetting agent.

The aqueous dispersion contains the at least one organopolysiloxane fluid at a preferred level of from about 4% to about 8% by weight of the dispersion, at a more preferred level of from about 6% to about 8% by weight of the dispersion, and at a most preferred level of about 7.8% by weight of the dispersion.

The at least one polydiorganosiloxane is preferably a polydimethylsiloxane fluid. The polydimethylsiloxane fluid preferably has a viscosity of from about 2 to about 60,000 centistokes (cSt) at 25° C., more preferably a viscosity of from about 300 to about 400 cSt at 25° C., and most preferably a viscosity of about 350 cSt at 25° C.

The aqueous dispersion of this invention contains the alkali-swellable acrylic polymer or copolymer. In one embodiment of the invention the alkali-swellable acrylic polymer or copolymer is crosslinked with a polyalkenyl polyether. The alkali-swellable acrylic polymer or copolymer is present at a level of from about 0.02% to about 0.20% by weight of the dispersion, more preferably at a level of from about 0.05% to about 0.1% by weight of the dispersion, and most preferably at a level of about 0.05 to about 0.7% by weight of the dispersion.

A particularly preferred alkali-swellable acrylic polymer or copolymer crosslinked with a polyalkenyl polyether for use in the present invention is commercially available under the tradename Carbopol® ETD 2691 (Lubrizol Advanced Materials, Inc. (formerly Noveon, Inc.), a subsidiary of The Lubrizol Corporation).

The water used in the present invention is preferably distilled water. The aqueous dispersion of this invention contains water preferably at a level of at least about 80% by weight, more preferably from about 85% to about 98% by weight, and most preferably about 90 to about 95% by weight.

A second aspect of the present invention is directed to a method of using the aqueous dispersion of this invention to enhance shine or gloss in elastomeric surfaces, involving:

(1) applying an effective amount of the aqueous dispersion to an elastomeric surface; and
(2) distributing the dispersion onto the surface with an application implement.

The composition is preferably applied by spraying onto the surface.

The elastomeric surface is preferably vinyl, leather, synthetic plastic, rubber or other elastomeric surface. More preferably, the elastomeric surface comprises rubber and includes, but is not limited to, an automotive tire, automotive bumper, bicycle tire, and the like.

In addition to enhancing shine or gloss in elastomeric surfaces, the aqueous dispersion of this invention will also clean, protect and preserve such surfaces.

The aqueous dispersion of the present invention contains low levels of polydiorganosiloxane, less than 10% by weight, but achieves a high level of shine upon application as compared with traditional and existing automotive protectant compositions containing high levels of silicone, from 10% to 40%. With the present invention, a high level of shine is achieved by efficient deposition of polyorganosiloxane to the surface through a new dispersion form which contains high levels of water and low levels of siloxane. In contrast, traditional automotive protectant compositions use silicone emulsions to deliver shine to surfaces while maintaining product shelf stability.

Another advantage of the present invention is that the aqueous dispersion does not require the presence of a surfactant or other emulsifying agent to achieve phase stability. High levels of surfactant 1% to about 5% by weight, in traditional automotive products cause an uneven appearance of shine upon initial application and over time. The elimination of surfactant or other emulsifying agent from the aqueous dispersion of the present invention increases the surface protection of the automotive composition by avoiding introduction of ultraviolet active substances that can create free radicals and cause surface damage over time.

A still further advantage of the present invention is that it can deliver more than twice the amount of silicone to the surface of a substrate versus traditional emulsions because the emulsion is weak and breaks upon application allowing more of the silicone to be absorbed into the target surface or substrate. In addition, the aqueous dispersion of the present invention provides a more uniform and durable shine than traditional automotive tire shine products. These two advantages are achieved due to the weaker but shelf stable dispersion that more readily breaks upon application, thus delivering more silicone to the surface, and to the presence of a low level (e.g., less than 1% by weight) of wetting agent in the composition.

The aqueous dispersions of this invention also exhibit desirable chemical and physical properties, including ease of formulation, stability, processability, handling, extended storage stability, resistance to prolonged heating, cooling and freezing, application uniformity, surface substantivity and ease of dispensing.

In one aspect of the invention, the inventive dispersions may also exhibit desirable aesthetic properties, including a typically more transparent or translucent appearance than the appearance of a typical silicone oil emulsion, which appears milky or white to the eye when it is stored in a container.

Further features and advantages of the present invention will become apparent to those of ordinary skill in the art in view of the detailed description of exemplary embodiments below, when considered together with the attached drawings and claims.

BRIEF DESCRIPTION OF THE DRAWINGS

The foregoing aspects and others will be readily appreciated by the skilled artisan from the following description of illustrative embodiments when read in conjunction with the accompanying drawings.

FIG. 1 shows a plot of the Elastic Modulus Value (G', in Pascals) as a function of strain from a rheological stress sweep measurement for example (ex. numbers as shown for each data curve) compositions representing selected embodiments of the present invention. The data curves show embodiments of the present invention that exhibit a range of Critical Strain Values ($\gamma_o$) which is the strain at the point at which the Elastic Modulus decreases from the constant value exhibited in the linear viscoelastic region. The corresponding numerical values of these rheological parameters and corresponding example compositions of the inventive embodiments are also presented in Table I.

These and other objects and advantages of the present invention will become more fully apparent from the following description taken in conjunction with the accompanying examples of embodiments of the present invention.

DETAILED DESCRIPTION OF THE INVENTION

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "surfactant" includes two or more such surfactants.

As used herein, the term "sprayable" is meant that the aqueous dispersion herein can be sprayed or "misted" by means of conventional trigger-pump, manually-actuated spray bottles, aerosol spray bottles, otherwise powered spraying devices.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the exemplary materials and methods are described herein.

In the application, effective amounts are generally those amounts listed as the ranges or levels of ingredients in the descriptions, which follow hereto. Unless otherwise stated, amounts listed in percentage ("%'s") are in weight percent (based on 100% active) of the total composition.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

The term "surfactant", as used herein, is meant to mean and include a substance or compound that reduces surface tension when dissolved in water or water solutions, or that reduces interfacial tension between two liquids, or between a liquid and a solid. The term "surfactant" thus includes anionic, cationic, nonionic, zwitterionic and/or amphoteric agents.

The terms "viscosity", as used herein is the viscosity of a liquid component of the invention as quoted as a kinematic viscosity in centistokes (cSt), measured at 25° C. (77° F.), unless otherwise specified.

The present invention provides compositions in the form of aqueous dispersions which not only clean, protect and preserve elastomeric surfaces but which also enhances shine or gloss in such surfaces.

The aqueous dispersions of the present invention do not require conventional emulsifying agents (e.g., surfactants, solvents and hydrotropes) to achieve phase stability. Although conventional emulsifying agents are unnecessary for stability, low levels of wetting agent may be present in the aqueous dispersion to allow the composition to uniformly spread and treat the target surface or substrate. Typically less than 1% by weight of a wetting agent is necessary to provide the benefits of uniformity and wetting to a treated surface. In one embodiment less than 0.5% of a wetting agent is used in the aqueous dispersion.

The dispersions may exhibit a rheological Critical Strain value greater than zero and less than about 0.5 and an Elastic Modulus value greater than zero and less than about 400 Pascals.

Silicone

The aqueous dispersions of this invention contain at least one fluid. These polyorganosiloxane fluids are also commonly polydiorganosiloxanes and are referred to as "silicone oils" or "silicones" and are distinguished from silicone elastomers and resins, which are more thoroughly cross-linked than silicone oils.

Suitable polydiorganosiloxane fluids for use in the present invention are disclosed, e.g., in U.S. Patent Application Publication No. 2005/0250668, and in U.S. Pat. Nos. 6,206,956 and 6,221,433 (both to Muntz et al.) and U.S. Pat. No. 7,074,262 to Huang et al., all of which are hereby incorporated by reference herein in their entirety.

The polyorganosiloxane fluid used in the present invention is preferably a polydiorganosiloxane fluid is selected from the group consisting of silicone oils having the general formula:

a. 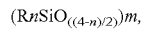$(RnSiO_{((4-n)/2)})m$, wherein n is between 0 and 3, m is 2 or greater, and R is selected from the group consisting of alkyl, alkylene, allyl, aryl, benzyl, phenyl, amine, amide, vinyl, fluoroalkyl, perfluoroalkane, carboxyester and quaternary alkyl ammonium radicals, and mixtures thereof. Additional suitable polydiorganosiloxanes are defined in Silicone Compounds Register and Review, 5th Edition, R. Anderson, G. L. Larson and C. Smith Eds., Hüls America Inc., Piscataway, N.J., p 247 (1991), which is hereby incorporated by reference These example silicones can be linear or branched. Various naming conventions and nomenclature that are essentially equivalent to this exemplary class of silicones, include, but are not limited to: dialkylpolysiloxane hydrolyzate; alpha-alkyl-omega-methoxypolydialkylsiloxane; polydialkyl silicone oil; poly(dialkyl-siloxane); alkyl end-blocked polydialkylsiloxane; polyoxy(dialkylsilylene), alpha-(trialkylsilyl)-omega-hydroxy; poly[oxy(dialkylsilylene)], alpha-[trialkylsilyl]-omega-[(trialkylsilyl)oxy]; and alpha-(trialkylsilyl)poly[oxy(dialkylsilylene)]-omega-alky. Some additional suitable examples also include dimethicone copolyol, dimethyl-polysiloxane, diethylpolysiloxane, high molecular weight dimethicone, mixed C1-C30 alkyl polysiloxane, phenyl dimethicone, dimethiconol, and mixtures thereof. Non-limiting examples of silicones useful herein are also described in U.S. Pat. No. 5,011,681, to Ciotti et al., which is hereby incorporated by reference. The silicone compounds useful herein also include polyalkyl or polyaryl siloxanes. The alkyl or aryl groups substituted on the siloxane chain (R) or at the ends of the siloxane chains can have any structure as long as the resulting silicone remains fluid at or around room temperature. Suitable R groups include hydroxy, methyl, methoxy, ethyl, ethoxy, propyl, propoxy, phenyl, methylphenyl, phenylphenyl, aryl and aryloxy. One or more R groups on the silicon atom may represent the same group or different groups, or any combination thereof.

Suitable silicone compounds are polydimethylsiloxane, polydiethylsiloxane, and polymethylphenylsiloxane. Polydimethylsiloxane, which is also known as dimethicone, is suitable and readily available in many forms and grades, including for example, edible grades suitable for use in compositions for food contact usage. The polyalkylsiloxanes that can be used include, for example, polydimethylsiloxanes. These silicone compounds are available, for example, from the General Electric Company in their Viscasil® and SF 96 series, and from Dow Corning in their Dow Corning 200 series. In one embodiment of the invention, the polydimethylsiloxane fluid for use in the present invention has a viscosity of about 350 cSt at 25° C. Such a polydimethylsiloxane fluid is commercially available, e.g., from Dow Corning under the tradename "DC-200 Fluid". Polyalkylaryl siloxane fluids containing one or more alkyl or alkylaryl substituents can also be used, for example, and include, but are not limited to polymethylphenylsiloxanes, poly[(dimethylsiloxane)/methylvinyl-siloxane)], poly[(dimethylsiloxane)/(diphenylsiloxane)], poly[(dimethylsiloxane)/-(phenylmethylsiloxane)], and poly[(dimethylsiloxane)/(diphenylsiloxane)/(methyl-vinylsiloxane)]. These siloxanes are available, for example, from the General Electric Company as SF 1075 methyl phenyl fluid or from Dow Corning as 556 Cosmetic Grade Fluid, Rhodorsil 763 from Rhône-Poulenc, Silbione 70641 V 30 and 70641 V 200 from Rhône-Poulenc, the silicones of the PK series from Bayer, such as PK20, the silicones of the PN and PH series from Bayer, such as PN 1000 and PH 1000, and certain oils of the SF series from General Electric, such as SF 1250, SF 1265, SF 1154 and SF 1023.

Higher molecular weight silicones, including silicone gums and resins, may be used in accordance with the present invention and include polydiorganosiloxanes with a molecular mass of between 200,000 and 5,000,000, used alone or as a mixture in a solvent chosen from volatile silicones, polydimethylsiloxane (PDMS) oils, polyphenylmethylsiloxane (PPMS) oils, isoparaffins, methylene chloride, pentane, dodecane, tridecane and tetradecane, or mixtures thereof. The silicones can be linear or branched, and can be modified by chemical groups to provide additional properties. For example, suitable silicones also include the amino modified silicones, wherein R is an amine, amide or alkyl, dialkyl or trialkyl derivatized amine constituent. By substitution of one or more of the R groups with other organic or functionalized organic groups, such as vinyl, phenyl, fluoroalkyl, perfluoroalkane, carboxylic acid derivatives, carboxyester and quaternary ammonium derivatives, other organopolysiloxanes can be produced. Included are mixtures of these materials, for example, but not limited to: 1) mixtures formed from a polydimethylsiloxane hydroxylated at the end of the chain (Dimethiconol according to the CTFA nomenclature) and from a cyclic polydimethylsiloxane (Cyclomethicone according to the CTFA nomenclature), such as the product Q2 1401 sold by the company Dow Corning; 2) mixtures formed from a polydimethylsiloxane gum with a cyclic silicone, such as the product SF 1214 Silicone Fluid from General Electric, which is an SE 30 gum of MW 500,000 dissolved in SF 1202 Silicone Fluid (decamethylcyclo-pentasiloxane); 3) mixtures of two PDMS materials of different viscosities, for example a PDMS gum and a PDMS oil, such as the products SF 1236 and CF 1241 from the company General Electric. The product "SF 1236" is a mixture of an SE 30 gum defined above, with a viscosity of 20 m2/s, and of an SF 96 oil with a viscosity of 5×10-5 m2/s (15% SE 30 gum and 85% SF 96 oil). The product "CF 1241" is a mixture of an SE 30 gum (33%) and of a PDMS (67%) with a viscosity of 10-3 m2/s.

The organo-modified silicones in accordance with the present invention are silicones as defined above, containing in their general structure one or more organofunctional groups directly attached to the siloxane chain or attached via a hydrocarbon-based radical. Examples include silicones containing: a) polyethyleneoxy and/or polypropyleneoxy groups, optionally containing alkyl groups, such as: the product known as dimethicone copolyol sold by the company Dow Corning under the name "DC 1248", and alkyl (C12) methicone copolyol sold by the company Dow Corning under the name "Q2 5200", the oils "Silwet" L 722, L 7500, L 77 and L 711 from the company General Electric, the mixture of dimethicone copolyol and of cyclomethicone, such as the product sold under the name "Q2-3225C" by the company Dow Corning; the product "Mirasil DMCO" sold by Rhône-Poulenc; b) (per)fluoro groups, for instance trifluoroalkyl groups, such as, for example, those sold by the company General Electric under the names "FF 150 Fluorosilicone Fluid" or by the company Shin Etsu under the names "X-22-819", "X-22-820", "X-22-821", "X-22-822" or "FL 100"; c) hydroxyacylamino groups, such as those described in European patent application EP-A-0,342,834, and in particular the silicone sold by the company Dow Corning under the name "Q2-8413"; d) thiol groups, such as in the silicones "X 2-8360" from Dow Corning or "GP 72A" and "GP 71" from Genesee; Union Carbide or the silicone known as "Amodimethicone" in the CTFA dictionary; f) carboxylate groups, such as the products described in European patent EP 186,507 from Chisso Corporation, which is hereby incorporated by reference; g) hydroxylated groups, such as the polyorganosiloxanes containing a hydroxyalkyl function, described in patent application FR-A-2,589,476, which is hereby incorporated by reference, and in particular polyorganosiloxanes containing a γ-hydroxy-propyl function; h) alkoxylated groups containing at least 12 carbon atoms, such as the product "Silicone Copolymer F 7551" from SWS Silicones and the products "Abilwax 2428", "Abilwax 2434" and "Abilwax 2440" from the company Goldschmidt; i) acyloxyalkyl groups containing at least 12 carbon atoms, such as, for example, the polyorganosiloxanes described in patent application FR-A-2,641,185, which is hereby incorporated by reference, and in particular polyorganosiloxanes containing a stearoyloxypropyl function; j) quaternary ammonium groups, such as in the products "X2 81 08" and "X2 81 09" and the product "Abil K 3270" from the company Goldschmidt; k) amphoteric or betaine groups, such as in the product sold by the company Goldschmidt under the name "Abil B 9950"; l) bisulphite groups, such as in the products sold by the company Goldschmidt under the names "Abil S 201" and "Abil S 255". The block copolymers having a polysiloxane-polyoxyalkylene linear block as repeating unit, which are used in the context of the present invention, include those have the following general formula: ([Y(R2SiO) a R'2SiYO][CnH2nO)b])c(II) in which R and R', which may be identical or different, represent a monovalent hydrocarbon-based radical containing no aliphatic unsaturation, n is an integer ranging from 2 to 4, a is an integer greater than or equal to 5, particularly between 5 and 200 and even more particularly between 5 and 100, b is an integer greater than or equal to 4, particularly between 4 and 200 and even more particularly between 5 and 100, c is an integer greater than or equal to 4, particularly between 4 and 1000 and even more particularly between 5 and 300, Y represents a divalent organic group which is linked to the adjacent silicon atom via a carbon-silicon bond and to a polyoxyalkylene block via an oxygen atom, the average molecular weight of each siloxane block is between about 400 and about 10,000, that of each polyoxyalkylene block being between about 300 and about 10,000, the siloxane blocks represent from about 10% to about 95% of the weight of the block copolymer, the average molecular weight of the block copolymer being at least 3000 and particularly between 5000 and 1,000,000 and even more particularly between 10,000 and 200,000. R and R' are suitably chosen from the group comprising alkyl radicals such as, for example, the methyl, ethyl, propyl, butyl, pentyl, hexyl, octyl, decyl and dodecyl radicals, aryl radicals such as, for example, phenyl and naphthyl, arylalkyl radicals such as, for example, benzyl and phenethyl, and tolyl, xylyl and cyclohexyl radicals. Y is suitably selected from radicals including —R"—, —R"—CO—, —R"—NHCO—, —R"—NH—CO—NH—R"—NHCO or —R"—OCONH—R'"—NHCO—, where R" is a divalent alkylene group such as, for example, ethylene, propylene or butylene, and R'" is a divalent alkylene group or a divalent arylene group such as —C6H4, —C6H4C6H4-, C6H4-CH2-C6H4, C6H4-C(CH3)2C6H4. Even more particularly, Y represents a divalent alkylene radical, more particularly the —CH2-CH2-CH2- radical or the —C4H8- radical. The preparation of the block copolymers used in the context of the present invention is described in European application EP 0,492,657 A1, which is hereby incorporated by reference.

Also suitable are the use of one or more volatile silicones, that is silicone oils with sufficient vapor pressure or volatility sufficient to at least partially or completely evaporate into the atmosphere during and/or after application of the inventive compositions onto a surface. The inventive compositions may in one embodiment contain solely a volatile silicone fluid as the silicone oil, or in an alternative embodiment may optionally contain one or more volatile silicone fluids in combination, or in yet another embodiment may optionally contain one or more volatile and one or more non-volatile silicone fluids in combination. The more volatile silicones are believed to promote leveling of the residual silicone polish film, thus deepening the color of painted surfaces, and to aid in controlling the flowability and/or spreadability of the composition, particularly in embodiments of the invention employing less volatile or non-volatile silicone oils that are desired to be deposited onto the treated surface. Volatile silicone fluids generally are low viscosity silicone fluids with an appreciable vapor pressure at ambient temperatures. Generally, the volatile silicone fluids useful in the present invention have a viscosity of less than about 10 centistokes at 25° C., and optionally less than about 5 centistokes at 25° C.

Suitable volatile silicone fluids include the polydimethylcyclosiloxanes. Polydimethylcyclosiloxane fluids useful in the present invention can be defined by the general formula [(CH3)2 SiO]x where x has a value from three to eight. Generally, the polydimethylcyclosiloxane fluid useful in the present invention is a mixture of one or more of the various species represented by the above formula. The commercial polydimethylcyclosiloxanes are mixtures of the various species represented by the above formula and are considered within the scope of the present invention. Some suitable polydimethylcyclosiloxane fluids for use in this invention are those where octamethylcyclotetrasiloxane, decamethylcyclopentasiloxane, and dodecamethyl-cyclohexasiloxane (i.e. where x is from 4 to 6) predominate. The fluids where decamethylcyclopentasiloxane and dodecamethylcyclohexasiloxane predominate are particularly suited. In accordance with another embodiment, those volatile silicone fluids manufactured by Dow Corning™ Corporation are used. It is believed that Dow Corning 245 and 345 volatile silicone fluids primarily consist of decamethyl-cyclopentasiloxane with lesser amounts of dodecamethylcyclohexa-siloxane and minor amounts of octamethylcyclotetrasiloxane. Other suitable volatile silicones include "DC 200", DC 244", "DC 245", "DC 246", "DC 344", "DC 345", and "DC 346" (manufactured by Dow Corning); Silicone 7207 and Silicone 7158 (manufactured by the Union Carbide Corp.); SF 1202 (manufactured by General Electric); and SWS-03314 (manufactured by SWS Silicones, Inc.).

The polyorganosiloxane in the composition is believed to provide a water and water vapor resistant coating upon the surface of the treated materials to enhance their resistant to environmental stresses, such as water permeation, oxygen permeation and assault by other environmental contaminants.

The organopolysiloxanes are also useful for imparting a shine or glossy coating to the treated surfaces, resulting in enhanced appearance and other aesthetic benefits associated with modification of incident light, such as refractive and diffusive contributions to specular reflections that contribute to the perception of enhanced color and tone, and decreased perception of surface defects such as scratches, stress cracks, striations, and other surface defects that commonly develop on surfaces with normal age and wear. Hence, the organopolysiloxanes are useful for their restorative effect when used on aged and worn surfaces, particularly elastomeric surfaces that suffer most from these conditions.

The polyorganosiloxane in the composition are also believed to provide a soil, oil, dirt and grime resistant coating upon the surface of the treated materials, such as for example, household surfaces including, but not limited to stainless steel, tile, porcelain, marble and the like, to enhance their resistant to staining and soiling, water and microbial growth. In one embodiment of the present invention, the polyorganosiloxane includes one or more of a silicone selected from polydimethyl-siloxane, polydiethylsiloxane, polymethylphenylsiloxane, polyalkylarylsiloxane, polyethyleneoxydialkylsiloxane, polypropyleneoxydialkylsiloxane and polydialkyl-cyclosiloxane.

In suitable embodiments, the polyorganosiloxane comprises 0.01% by weight to about 10% by weight, or 4% by weight to about 10% by weight, or alternatively 6% by weight to about 9% by weight of the inventive composition.

The polyorganosiloxanee fluid has a viscosity of from about 2 to about 60,000 centistokes (cSt) at 25° C., and preferably a viscosity of from about 300 to about 400 cSt at 25° C.

Polymers and Copolymers

The inventive compositions require the use of at least one acrylic polymer or copolymer that provides rheological structure to the aqueous system in combination with the dispersed polyorganosiloxane. Polymers suitable for use are selected from the group of polymers that provide aqueous dispersions of the silicone oil in aqueous compositions exhibiting the desired rheological parameters which allow the composition to adhere to the treated surface. The ability of the composition to adhere to the treated surface is critical to preventing dripping. In addition, the composition may be applied without touching the surface by allowing the composition to be sprayed on a surface without the need to spread or wipe the treated surface. To help define the key rheological parameters of the composition, the terms Critical Strain value and Elastic Modulus, are used and described herein.

The primary function of the polymers is their utility in stabilizing fine dispersions, that is to say fine droplets, of the silicone oils in the aqueous phase, providing compositions with good handling, storage and dispensing characteristics that exhibit the characteristic rheological parameters described herein. Without being bound by theory, it is believed that polymers employed in the invention provide for extended polymer networks within the aqueous phase having properties, defined through the rheological parameters of Critical Strain and Elastic Modulus, that effectively stabilize a plurality of fine droplets of the hydrophobic phase through a physical mechanism without the requirement of emulsification, that is to say, without the requirement of surface active emulsifier compounds that are commonly employed in the art to modify the surface and/or interfacial properties of the hydrophobic phase for compatibility within the aqueous phase or water continuum.

Hence, the acrylic polymers and/or copolymers that are able to form extended networks in an aqueous environment are suitably employed in the inventive compositions and are selected from the class of polymers that exhibit the desired rheological parameters that have been discovered here to effectively represent a rheological domain, defined by the Critical Strain and Elastic Modulus as described herein, where the silicone oils can be formulated as fine dispersions without the use of conventional emulsifiers.

Also suitable are polymers that provide a dual benefit to the inventive compositions in that they provide for compositions exhibiting the desired rheological Critical Strain Value and Elastic Modulus Value parameters, and also providing an additional or secondary benefit. An exemplary secondary benefit is surface modification of the surfaces treated with the inventive compositions, whereby the surface is modified to exhibit a property such as enhanced hydrophilicity, hydrophobicity, anti-soiling, water and/or stain repellency, reduced friction, increased lubricity, softness, anti-static and/or charge dissipative properties, reduced dust and/or lint retention, and the combinations of these properties and/or benefits.

In suitable embodiments of the invention, polymeric material that improves the hydrophilicity of the surface being treated is incorporated into the present compositions. The increase in hydrophilicity provides improved final appearance by providing "sheeting" of the water from the surface and/or spreading of the water on the surface, and this effect is particularly seen when the surface is wiped following application of the inventive compositions, during which process the silicone component is preferentially deposited onto the treated surface and the excess water present in the composition is to be removed during the wiping process. A beneficial effect is also achieved when treated surfaces are rewetted and even when subsequently dried after the rewetting with a subsequent treatment with the inventive compositions. Polymer substantivity is beneficial as it prolongs the sheeting and cleaning benefits. Another desirable feature of suitable polymers is lack of visible residue upon drying.

In general, the inventive compositions may employ water-soluble or water dispersible polymers. The average molecular weight of the copolymer typically ranges from about 5,000 to about 10,000,000, with the suitable molecular weight range depending on the polymer composition with the proviso that the molecular weight is selected so that the copolymer is water soluble or water dispersible to at least 0.01% by weight in distilled water at 25° C.

The inventive compositions may employ nonionic (neutral and/or non-ionizable), anionic and/or cationic polymers, and their mixtures. Suitable anionic polymers include those with ionizable groups that are at least partially anionic in solution that is carrying a negative charge in solution, or which can be at least partially or fully neutralized to be at least partially or fully anionic in solution.

Suitable cationic polymers include polymers that are ionizable (i.e. capable of being protonated) and those with permanent cationic groups, that is carrying a permanent positive charge, in solution. The inventive compositions may employ hydrophilic polymers, hydrophobic polymers or polymers exhibiting both properties owing to the presence of hydrophilic and hydrophobic monomer moieties. Suitable hydrophilic polymers are those that are preferably attracted to surfaces and are absorbed thereto without covalent bonds. Examples of suitable polymers include the polymers and co-polymers of N,N-dialkyl acrylamide, acrylamide, and certain monomers containing substituted and/or unsubstituted quaternary ammonium groups and/or amphoteric groups that favor substantivity to surfaces, along with co-monomers that favor adsorption of water, such as, for example, acrylic acid and other acrylate salts, sulfonates, betaines, and ethylene oxides. Water soluble or water dispersible cationic polymers may be suitable for their charge dissipative effect, antistatic, surface lubricating and potential softening benefits.

Examples of permanently cationic monomers include, but are not limited to, quaternary ammonium salts of substituted acrylamide, methacrylamide, acrylate and methacrylate, such as trimethylammoniumethylmethacrylate, trimethylammonium-propylmethacrylamide, trimethylammoniumethylmethacrylate, trimethylammonium-propylacrylamide, 2-vinyl N-alkyl quaternary pyridinium, 4-vinyl N-alkyl quaternary pyridinium, 4-vinylbenzyltrialkylammonium, 2-vinyl piperidinium, 4-vinyl piperidinium, 3-alkyl 1-vinyl imidazolium, diallyldimethylammonium, and the ionene class of internal cationic monomers as described by D. R. Berger in Cationic Surfactants, Organic Chemistry, edited by J. M. Richmond, Marcel Dekker, New York, 1990, ISBN 0-8247-8381-6, which is incorporated herein by reference. This class includes co-poly ethylene imine, co-poly ethoxylated ethylene imine and co-poly quaternized ethoxylated ethylene imine, co-poly[(dimethylimino)trimethylene (dimethylimino)hexamethylene disalt], co-poly[(diethylimino) trimethylene (dimethylimino)trimethylene disalt], co-poly [(dimethylimino)2-hydroxypropyl salt], co-polyquarternium-2, co-polyquarternium-17, and co-polyquarternium-18, as described in the International Cosmetic Ingredient Dictionary, 5th Edition, edited by J. A. Wenninger and G. N. McEwen, which is incorporated herein by reference. Other cationic monomers include those containing cationic sulfonium salts such as co-poly-1-[3-methyl-4-(vinylbenzyloxy)phenyl]tetrahydrothiophenium chloride. Especially suitable monomers are mono- and di-quaternary derivatives of methacrylamide. The counterion of the cationic co-monomer can be selected from, for example, chloride, bromide, iodide, hydroxide, phosphate, sulfate, hydrosulfate, ethyl sulfate, methyl sulfate, formate, and acetate.

Examples of monomers that are cationic on protonation include, but are not limited to, acrylamide, N,N-dimethylacrylamide, N,N di-isopropylacryalmide, N-vinylimidazole, N-vinylpyrrolidone, ethyleneimine, dimethylaminohydroxypropyl diethylenetriamine, dimethylaminoethylmethacrylate, dimethylaminopropyl-methacrylamide, dimethylaminoethylacrylate, dimethylaminopropylacrylamide, 2-vinyl pyridine, 4-vinyl pyridine, 2-vinyl piperidine, 4-vinylpiperidine, vinyl amine, diallylamine, methyldiallylamine, vinyl oxazolidone; vinyl methyoxazolidone, and vinyl caprolactam.

Monomers that are cationic on protonation typically contain a positive charge over a portion of the pH range of 2-11.

Such suitable monomers are also presented in Water-Soluble Synthetic Polymers: Properties and Behavior, Volume II, by P. Molyneux, CRC Press, Boca Raton, 1983, ISBN 0-8493-6136. Additional monomers can be found in the International Cosmetic Ingredient Dictionary, 5th Edition, edited by J. A. Wenninger and G. N. McEwen, The Cosmetic, Toiletry, and Fragrance Association, Washington D.C., 1993, ISBN 1-882621-06-9. A third source of such monomers can be found in Encyclopedia of Polymers and Thickeners for Cosmetics, by R. Y. Lochhead and W. R. Fron, Cosmetics & Toiletries, vol. 108, May 1993, pp 95-135. All three references are incorporated herein.

Examples of acidic monomers that are capable of forming an anionic charge in the composition include, but are not limited to, acrylic acid, methacrylic acid, ethacrylic acid, dimethylacrylic acid, maleic anhydride, succinic anhydride, vinylsulfonate, cyanoacrylic acid, methylenemalonic acid, vinylacetic acid, allylacetic acid, ethylidineacetic acid, propylidineacetic acid, crotonic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, citraconic acid, vinylbenzoic acid, N-vinylsuccinamidic acid, mesaconic acid, methacroylalanine, acryloylhydroxyglycine, sulfoethyl methacrylate, sulfopropyl acrylate, and sulfoethyl acrylate. Exemplary acid monomers also include styrenesulfonic acid, 2-methacryloyloxymethane-1-sulfonic acid, 3-methacryloyloxy-propane-1-sulfonic acid, 3-(vinyloxy)propane-1-sulfonic acid, ethylenesulfonic acid, vinyl sulfuric acid, 4-vinylphenyl sulfuric acid, ethylene phosphonic acid and vinyl phosphoric acid. Suitable monomers include acrylic acid, methacrylic acid and maleic acid. The copolymers useful in this invention may contain the above acidic monomers and the alkali metal, alkaline earth metal, and ammonium salts thereof.

Examples of monomers having an uncharged hydrophilic group include but are not limited to vinyl alcohol, vinyl acetate, vinyl methyl ether, vinyl ethyl ether, ethylene oxide and propylene oxide. Also suitable are hydrophilic esters of monomers, such as hydroxyalkyl acrylate esters, alcohol ethoxylate esters, alkylpolyglycoside esters, and polyethylene glycol esters of acrylic and methacrylic acid.

Finally, examples of uncharged hydrophobic monomers include, but are not limited to, C1-C4 alkyl esters of acrylic acid and of methacrylic acid.

Suitable copolymers are formed by copolymerizing the desired monomers. Conventional polymerization techniques can be employed. Illustrative techniques include, for example, solution, suspension, dispersion, or emulsion polymerization. An exemplary method of preparation is by precipitation or inverse suspension polymerization of the copolymer from a polymerization media in which the monomers are dispersed in a suitable solvent. The monomers employed in preparing the copolymer are preferably water soluble and sufficiently soluble in the polymerization media to form a homogeneous solution. They readily undergo polymerization to form polymers which are water dispersible or water soluble. The exemplary copolymers contain acrylamide, methacrylamide and substituted acrylamides and methacrylamides, acrylic and methacrylic acid and esters thereof. Suitable synthetic methods for these copolymers are described, for example, in Kirk-Othmer, Encyclopedia of Chemical Technology, Volume 1, Fourth Ed., John Wiley & Sons.

Other examples of polymers that provide sheeting and anti-spotting benefits are polymers that contain amine oxide hydrophilic groups. Polymers that contain other hydrophilic groups such a sulfonate, pyrrolidone, and/or carboxylate groups can also be used. Examples of desirable poly-sulfonate polymers include polyvinylsulfonate, and also include polystyrene sulfonate, such as those sold by Monomer-Polymer Dajac (1675 Bustleton Pike, Feasterville, Pa. 19053). A typical formula is as follows: [CH(C6H4SO3Na)—CH2]n-CH(C6H5)-CH2 wherein n is a number to give the appropriate molecular weight as disclosed below.

Typical molecular weights are from about 10,000 to about 1,000,000, or alternatively from about 200,000 to about 700,000. Exemplary polymers containing pyrrolidone functionalities include polyvinyl pyrrolidone, quaternized pyrrolidone derivatives (such as Gafquat 755N from International Specialty Products), and co-polymers containing pyrrolidone, such as polyvinylpyrrolidone/dimethylaminoethyl-methacrylate (available from ISP) and polyvinyl pyrrolidone/acrylate (available from BASF). Other materials can also provide substantivity and hydrophilicity including cationic materials that also contain hydrophilic groups and polymers that contain multiple ether linkages. Cationic materials include cationic sugar and/or starch derivatives and the typical block copolymer detergent surfactants based on mixtures of polypropylene oxide and ethylene oxide are representative of the polyether materials. The polyether materials are less substantive, however.

Also suitable are polymers comprising water-soluble amine oxide moieties. It is believed that the partial positive charge of the amine oxide group acts to adhere the polymer to the surface of the surface substrate, thus allowing water to "sheet" more readily. To the extent that polymer anchoring promotes better "sheeting", then higher molecular weight materials are suitable. Increased molecular weight improves efficiency and effectiveness of the amine oxide-based polymer. Suitable polymers of this invention may have one or more monomeric units containing at least one N-oxide group. At least about 10%, suitably more than about 50%, more suitably greater than about 90% of said monomers forming said polymers contain an amine oxide group. These polymers can be described by the general formula: P(B) wherein each P is selected from homopolymerizable and copolymerizable moieties which attach to form the polymer backbone, suitably vinyl moieties, e.g. C(R)2-C(R)2, wherein each R is H, C1-C12, preferably C1-C4 alkyl(ene), C6-C12 aryl(ene) and/or B; B is a moiety selected from substituted and unsubstituted, linear and cyclic C1-C12 alkyl, C1-C12 alkylene, C1-C12 heterocyclic, aromatic C6-C12 groups and wherein at least one of said B moieties has at least one amine oxide group present; u is from a number that will provide at least about 10% monomers containing an amine oxide group to about 90%; and t is a number such that the average molecular weight of the polymer is from about 2,000 to about 500,000, alternatively from about 5,000 to about 250,000, and also alternatively from about 7,500 to about 200,000. Exemplary polymers also include poly(4-vinylpyridine N-oxide) polymers (PVNO), wherein the average molecular weight of the polymer is from about 2,000 to about 500,000, alternatively from about 5,000 to about 400,000, and also alternatively from about 7,500 to about 300,000. In general, higher molecular weight polymers are suitable. Often, higher molecular weight polymers allow for use of lower levels of the polymer, which can provide benefits in surface cleaner applications of the inventive compositions. The desirable molecular weight range of polymers useful in the present invention stands in contrast to that found in the art relating to polycarboxylate, polystyrene sulfonate, and polyether based additives, which prefer molecular weights in the range of 400,000 to 1,500,000. Lower molecular weights for the exemplary poly-amine oxide polymers of the present invention are due to greater difficulty in manufacturing these polymers in higher molecular weight.

Some non-limiting examples of homopolymers and copolymers which can be used as water soluble polymers of the present invention are: adipic acid/dimethylaminohydroxypropyl diethylenetriamine copolymer; adipic acid/epoxypropyl diethylenetriamine copolymer; polyvinyl alcohol; methacryloyl ethyl betaine/methacrylates copolymer; ethyl acrylate/methyl methacrylate/methacrylic acid/acrylic acid copolymer; polyamine resins; and polyquaternary amine resins; poly(ethenylformamide); poly(vinylamine) hydrochloride; poly(vinyl alcohol-co-vinylamine); poly(vinyl alcohol-co-vinylamine); poly(vinyl alcohol-co-vinylamine hydrochloride); and poly(vinyl alcohol-co-vinylamine hydrochloride). Alternatively, said copolymer and/or homopolymers are selected from the group consisting of adipic acid/dimethylaminohydroxypropyl diethylenetriamine copolymer; poly(vinylpyrrolidone/dimethylaminoethyl methacrylate); polyvinyl alcohol; ethyl acrylate/methyl methacrylate/ethacrylic acid/acrylic acid copolymer; methacryloyl ethyl betaine/methacrylates copolymer; polyquaternary amine resins; poly(ethenyl-formamide); poly(vinylamine) hydrochloride; poly(vinyl alcohol-co-vinylamine); poly(vinyl alcohol-co-vinylamine); poly(vinyl alcohol-co-vinylamine hydrochloride); and poly(vinyl alcohol-co-vinylamine hydrochloride).

Polymers useful in the present invention can be selected from the group consisting of copolymers of hydrophilic monomers. The polymer can be linear random or block copolymers, and mixtures thereof. The term "hydrophilic" is used herein consistent with its standard meaning of having at least some affinity for water. As used herein in relation to monomer units and polymeric materials, including the copolymers, "hydrophilic" means substantially water soluble and/or substantially water dispersible. In this regard, "substantially water soluble" or "substantially water dispersible" shall refer to a material that is soluble and/or dispersible in distilled (or equivalent) water, at 25° C., at a concentration of about 0.0001% by weight or greater. The terms "soluble", "solubility", "dispersible", and the like, for purposes hereof, correspond to the maximum concentration of monomer or polymer, as applicable, which can dissolve or disperse in water and/or other solvents, or their mixtures, to form a homogeneous solution, as is well understood to those skilled in the art.

Non-limiting examples of useful hydrophilic monomers are unsaturated organic mono- and polycarboxylic acids, such as acrylic acid, methacrylic acid, crotonic acid, maleic acid and its half esters, itaconic acid; unsaturated alcohols, such as vinyl alcohol, allyl alcohol; polar vinyl heterocyclics, such as, vinyl caprolactam, vinyl pyridine, vinyl imidazole; vinyl amine; vinyl sulfonate; unsaturated amides, such as acrylamides, e.g., N,N-dimethylacrylamide, N-t-butyl acrylamide; hydroxyethyl methacrylate; dimethylaminoethyl methacrylate; salts of acids and amines listed above; and the like; and mixtures thereof. Some exemplary hydrophilic monomers are acrylic acid, methacrylic acid, N,N-dimethyl acrylamide, N,N-dimethyl methacrylamide, N-t-butyl acrylamide, dimethylamino ethyl methacrylate, thereof, and mixtures thereof.

Polycarboxylate polymers are those formed by polymerization of monomers, at least some of which contain carboxylic functionality. Common monomers include acrylic acid, maleic acid, ethylene, vinyl pyrrolidone, methacrylic acid, methacryloyl-ethylbetaine, etc. Exemplary polymers for substantivity are those having higher molecular weights. For example, polyacrylic acid having molecular weights below about 10,000 are not particularly substantive and therefore do not normally provide hydrophilicity for three re-wettings of a treated surface with the inventive compositions, although with higher levels, molecular weights down to about 1000 can provide some results. In general, the polymers should have molecular weights of more than about 10,000, preferably more than about 20,000, more preferably more than about 300,000, and even more preferably more than about 400,000. It has also been found that higher molecular weight polymers, e.g., those having molecular weights of more than about 10,000,000, are extremely difficult to formulate and are less effective in providing anti-spotting benefits than lower molecular weight polymers. Accordingly, the molecular weight should normally be, especially for polyacrylates, from about 1,000 to about 10,000,000; alternatively from about 5,000 to about 5,000,000; alternatively from about 10,000 to about 2,500,000; and also suitably from about 20,000 to about 1,000,000.

Non-limiting examples of polymers for use in the present invention include the following: poly(vinyl pyrrolidone/acrylic acid) sold under the name "Acrylidone"® by ISP and poly(acrylic acid) sold under the name "Accumer"® by Rohm & Haas. Other suitable materials include sulfonated polystyrene polymers sold under the name Versaflex® sold by National Starch and Chemical Company, especially Versaflex 7000. Additional suitable polymers and copolymers include alkali-swellable acrylic homopolymer or copolymer crosslinked with a polyalkenyl polyether for use in the present invention is commercially available under the tradename Carbopol® ETD 2691 (Lubrizol Advanced Materials, Inc. (formerly Noveon, Inc.), a subsidiary of The Lubrizol Corporation).

Suitable polymers may be selected from the group consisting of water soluble and water dispersible polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof. In additional suitable polymers, copolymers or derivatives thereof are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xantham and carrageen. Also suitable are polymers are selected from polyvinyl alcohols, polyvinyl alcohol copolymers and hydroxypropyl methyl cellulose (HPMC)\, xantham gum and starch.

Exemplary polymers are also selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and alkali-swellable acrylic homopolymer or copolymer crosslinked with a polyalkenyl polyether The polymer may have any weight average molecular weight from about 1000 to 1,000,000, or even from 10,000 to 300,000 or even from 15,000 to 200,000 or even from 20,000 to 150,000.

Also useful are polymer blend compositions, for example blends comprising a hydrolytically degradable and water-soluble polymer blend such as polylactide and polyvinyl alcohol, achieved by the mixing of polylactide and polyvinyl alcohol, typically comprising 1-35% by weight polylactide and approximately from 65% to 99% by weight polyvinyl alcohol, if the material is to be water-dispersible, or water-soluble.

In suitable embodiments, the polymer or copolymer comprises 0.001% by weight to about 5% by weight, or 0.2% by weight to about 2% by weight, or alternatively 0.05% by weight to about 0.1% by weight of the inventive composition. In one embodiment the polymer is selected from the group consisting of: polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof. In one embodiment, the polymer is an alkali-swellable acrylic polymer or copolymer cross-linked with at least one polyalkenyl polyether monomer.

The aqueous dispersion of this invention contains the acrylic polymer or copolymer at a level of from about 0.05% to about 0.10% by weight of the dispersion, more preferably at a level of from about 0.05% to about 0.07% by weight of the dispersion, and most preferably at a level of about 0.05% by weight of the dispersion.

The water used in the aqueous dispersion of this invention may be deionized, industrial soft water or any suitable grade of water. Preferably, the water used in the aqueous dispersion is deionized or distilled water. The aqueous dispersion of this invention contains water preferably at a level of at least about 80% by weight, more preferably from about 85% to about 95% by weight, and most preferably about 92% by weight.

Wetting Agents

Also suitable for use, and particularly in combination with other silicone oils, are the class of silicone wetting and/or leveling agents which aid in the spreading and leveling of silicone oils onto treated surfaces. Some of the exemplary silicones described above may serve this purpose in addition to their coating properties. Additional examples also include, but are not limited to, polyalkyleneoxide modified polydimethylsiloxane, available from General Electric as "Silwet 7650", polyalkyleneoxide modified heptamethyltrisiloxane, also available from General Electric as "Silwet 7280" and "Silwet 7608", silicone glycol copolymer surfactant, available from Dow Corning as "DC 57" and the Dow Corning silicone polyether wetting agent designated "Q2-5211". Additional examples also include materials with additional leveling properties, such as for example, but not limited to alkyl methyl siloxanes DC 56 available from Dow Corning and organomodified dimethylsiloxane available from General Electric designated as Formasil 433.

Additional suitable wetting agents are disclosed, for example, in U.S. Patent Application Publication No. 2005/0250668 to Serobian et al., which was previously incorporated by reference herein.

Mixtures and combinations of any of the silicone oils and wetting agents exampled herein, for example, silicone oils having different molecular weights, different viscosities, different functionalized derivatives, different volatilities and/or vapor pressures, different properties and benefits, and combinations thereof, may advantageously be combined in the compositions of the present invention. For example, a "lighter" or lower viscosity polyorganosiloxane can be combined with a "heavier" or higher viscosity silicone oil, and/or a silicone gum and/or silicone elastomer for purposes of dispersion in the compositions of the present invention, wherein the "heavier" materials would otherwise be difficult to handle and disperse if used solely or in combinations without a "lighter" silicone included. Alternatively, volatile silicone oil may be combined with less volatile or essentially non-volatile silicone oil, depending on the end use application. Alternatively, a silicone oil having spreading, wetting or selective leveling properties may be combined with another silicone oil in order to enhance the spreading and leveling of the combined silicone oil mixture for beneficial effect on the surfaces treated with the inventive compositions described herein.

In one embodiment, the composition is self-leveling which is desirable because it enables the user to apply the composition to a treated surface without using an absorbent applicator or carrier to spread the composition over a surface. Having a no-touch application by spraying, misting, dipping, etc. is desirable because it is easier for the user to apply the composition in a uniform manner and the composition is not wasted by being absorbed onto a carrier rather than applied to the desired surface.

The use of silicone oils in the inventive compositions containing the above-described and other substituted organopolysiloxanes, and their combinations and mixtures, is a matter of choice, depending upon the material to be treated and/or the environment to which the treated materials are to be subject, as well as depending upon the desired surface characteristics desired to be imparted to the surface. Similarly, any the wetting agent may vary depending on the polyorganosiloxane or the mixture organopolysiloxanes in the composition. The silicones and/or wetting agent may be premixed in their desired proportions prior to processing, or mixed during actual processing of the inventive compositions, or combined into the inventive compositions in any suitable order or fashion, subject solely to considerations of ease of handling, transport, mixing and processing of the inventive compositions.

Solvent

A solvent may optionally be included in the compositions of the present invention to assist in removing dirt, grease, and other unwanted impurities from the surface to be treated. The particular solvent employed in the inventive composition may be selected depending on the particular end use application and particularly on the type of surface to be treated. In addition, the solvent may serve to help solubilize non-water soluble or poorly water soluble adjuvants, such as ultraviolet light (UV) absorbers, fragrances, perfumes and the like, for the purpose of preventing separation of these ingredients in the inventive compositions. Suitable solvents include those having a range of relative volatilities, or vapor pressures, including solvents with very low vapor pressures and those solvents with very high vapor pressures, depending on the particular application. Suitable solvents include both hydrophilic and hydrophobic compounds, generally comprising solvents that are water soluble, water-miscible as well as water insoluble and water-immiscible compounds Suitable organic solvents include, but are not limited to, $C_{1-6}$ alkanols, $C_{1-6}$ diols, $C_{1-10}$ alkyl ethers of alkylene glycols, $C_{3-24}$ alkylene glycol ethers, polyalkylene glycols, short chain carboxylic acids, short chain esters, isoparaffinic hydrocarbons, mineral spirits, alkylaromatics, terpenes, terpene derivatives, terpenoids, terpenoid derivatives, formaldehyde, and pyrrolidones. Alkanols include, but are not limited to, methanol, ethanol, n-propanol, isopropanol, butanol, pentanol, and hexanol, and isomers thereof. Diols include, but are not limited to, methylene, ethylene, propylene and butylene glycols. Alkylene glycol ethers include, but are not limited to, ethylene glycol monopropyl ether, ethylene glycol monobutyl ether, ethylene glycol monohexyl ether, diethylene glycol monopropyl ether, diethylene glycol monobutyl ether, diethylene glycol monohexyl ether, propylene glycol methyl ether, propylene glycol ethyl ether, propylene glycol n-propyl ether, propylene glycol monobutyl ether, propylene glycol t-butyl ether, di- or tri-polypropylene glycol methyl or ethyl or propyl or butyl ether, acetate and propionate esters of glycol ethers. Commercial examples of these solvents available from the Dow Chemical Company include, but are not limited to propylene glycol methyl ether acetate (available as Dowanol® PMA), dipropylene glycol methyl ether acetate (available as Dowanol® DPMA), propylene glycol n-butyl ether (available as Dowanol® PnB), dipropylene glycol n-butyl ether (available as Dowanol® TPnB), propylene glycol phenol ether (available as Dowanol® PPh), ethylene glycol monobutyl ether (available as Dowanol® EB), diethylene glycol monobutyl ether (available as Dowanol® DB), ethylene glycol monohexyl ether (available as Hexyl Cellosolve®), diethylene glycol monohexyl ether (available as Hexyl Carbitol®), hydroxy-polyethers (available as Ecosoft Solvents®), ethylene glycol phenyl ether (available as Dowanol® Eph), ethylene glycol phenol ether (available as Dalpad a Coalescing Agent), ethylene glycol n-butyl ether acetate (available as Butyl Cellosolve Acetate®), diethylene glycol n-butyl ether acetate (available as Butyl Carbitol Acetate®), dipropylene glycol n-propyl ether (available as Dowanol® DPnP) and mixtures thereof. Short chain carboxylic acids include, but are not limited to, acetic acid, glycolic acid, lactic acid and propionic acid. Short chain esters include, but are not limited to, glycol acetate, and cyclic or linear volatile alkylsiloxanes. Water insoluble solvents such as isoparaffinic hydrocarbons, mineral spirits, alkylaromatics, terpenoids, terpenoid derivatives, terpenes, and terpenes derivatives can be mixed with a water soluble solvent when employed.

Examples of organic solvent having a vapor pressure less than 0.1 mm Hg (20° C.) include, but are not limited to, dipropylene glycol n-propyl ether, dipropylene glycol t-butyl ether, dipropylene glycol n-butyl ether, tripropylene glycol methyl ether, tripropylene glycol n-butyl ether, diethylene glycol propyl ether, diethylene glycol butyl ether, dipropylene glycol methyl ether acetate, diethylene glycol ethyl ether acetate, and diethylene glycol butyl ether acetate (all available from Dow Corning Company).

These solvents may be combined with the silicone oils and/or silicone oil mixtures in order to better couple the silicone oils and/or their mixtures with the polymers employed to produce the aqueous dispersions of the inventive compositions. The aqueous dispersion of this invention is prepared in the conventional manner, and concentrated as well as dilute dispersions can be formed. In one embodiment, glycols such as propylene glycol, ethylene glycol, or low molecular weight polyols such as glycerin, etc., may be added during the initial dispersion preparation to ensure a stable, readily dispersible concentrate. In one embodiment of the invention, solvents which have a similar refractive index to that of the polyorganosiloxane are used to make the inventive composition transparent or clear. By matching the refractive indices of the two phases in the aqueous dispersion transparency may be achieved. Since organopolysiloxane has a refractive index in the range of 1.4 to 1.5, solvents with a refractive index in the same range are preferable for making clear formulations. Suitable solvents which fall within the refractive index range of about 1.4 to 1.5 include but are not limited to, glycerin and sorbitol.

In suitable embodiments, the solvent comprises 0.0001% by weight to about 50% by weight, or 0.001% by weight to about 10% by weight, or alternatively 0.01% by weight to about 5% by weight of the inventive composition.

Additional Adjuncts

The inventive compositions optionally contain one or more of the following adjuncts: lubricants, wetting agents, leveling agents, pH adjusters, buffers, spreading agents, odor control agents, perfumes, fragrances and fragrance release agents, brighteners, fluorescent whitening agents, ultraviolet (UV) absorbers, UV scatterers, infra-red (IR) absorbers, IR scatterers, free-radical quenchers, free-radical stabilizers, excited state quenchers (ESQ) and/or anti-oxidants, and their mixtures. Examples of UV effective agents suitable for use include, but are not limited to Tinuvin 123, Tinuvin 292, Tinuvin 384, Tinuvin 171 and Tinuvin 99, all available form the Ciba Chemical Company. Other adjuncts include, but are not limited to, acids, electrolytes, dyes and/or colorants and/or pigments, solubilizing materials, stabilizers, thickeners, defoamers, hydrotropes, cloud point modifiers, preservatives, and other polymers and their mixtures. The solubilizing materials, when used, include, but are not limited to, hydrotropes (e.g. water soluble salts of low molecular weight organic acids such as the sodium and/or potassium salts of toluene, cumene, and xylene sulfonic acid). Defoamers, when used, include, but are not limited to, silicones, aminosilicones, silicone blends, and/or silicone/hydrocarbon blends.

The aqueous dispersion of this invention may further contain one or more adjuncts selected from buffering and pH adjusting agents, wetting agents, abrasives, whitening agents, pigments, microbiocides, preservatives and mixtures thereof.

These and other suitable additives which can be used in the composition of the present invention are disclosed, e.g., in U.S. Patent Application Publication No. 2005/0250668, and in U.S. Pat. Nos. 6,206,956 and 6,221,433 (both to Muntz et al.) and U.S. Pat. No. 7,074,262 to Huang et al., all of which were previously incorporated by reference herein.

Buffering and pH adjusting agents, when used, include, but are not limited to, organic acids, mineral acids, alkali metal and alkaline earth salts of silicate, metasilicate, polysilicate, borate, hydroxide, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and 2-amino-2-methylpropanol. Exemplary buffering agents for compositions of this invention are nitrogen-containing materials. Some examples are amino acids such as lysine or lower alcohol amines like mono-, di-, and tri-ethanolamine. Other exemplary nitrogen-containing buffering agents are tri(hydroxymethyl)amino methane (TRIS), 2-amino-2-ethyl-1,3-propanedi-ol, 2-amino-2-methyl-propanol, 2-amino-2-methyl-1,3-propanol, disodium glutamate, N-methyl diethanolamide, 2-dimethylamino-2-methylpropanol (DMAMP), 1,3-bis(methylamine)-cyclohexane, 1,3-diamino-propanol N,N'-tetra-methyl-1,3-diamino-2-propanol, N,N-bis(2-hydroxyethyl)glycine (bicine) and N-tris(hydroxymethyl)methyl glycine (tricine), morpholine and morpholine derivatives.

Other suitable buffers include ammonium carbamate, citric acid, acetic acid. Mixtures of any of the above are also acceptable. Useful inorganic buffers/alkalinity sources include ammonia, the alkali metal carbonates and alkali metal phosphates, e.g., sodium carbonate, sodium polyphosphate. Additional buffers are disclosed in WO 95/07971, which is incorporated herein by reference. Other suitable pH adjusting agents include sodium or potassium hydroxide. Alternatively, an alkalizing agent may be used that exhibits or combines one or more of the desired properties of the class of materials known in the art as pH adjusters, alkalis, base, alkalinity agents, builders and buffers. For example, the composition of this invention may include a builder that serves as an alkalizer or pH adjusting agent effective at controlling the composition pH as well as providing builder functionality to the inventive composition during use is selected. In another embodiment of the invention, a buffer may be employed that serves to at least partially neutralize a polymer during the preparation stage of the compositions, and further serves to control the pH of the inventive composition over long storage times.

In suitable embodiments, the additional adjunct comprises 0.0001% by weight to about 20% by weight, or 0.001% by weight to about 10% by weight, or alternatively 0.01% by weight to about 5% by weight of the inventive composition.

Preservatives

Preservatives, when used, include, but are not limited to, mildewstat or bacteriostat, methyl, ethyl and propyl parabens, short chain organic acids (e.g. acetic, lactic and/or glycolic acids), bisguanidine compounds (e.g. Dantogard and/or Glydant) and/or short chain alcohols (e.g. ethanol and/or IPA). An example of a suitable preservative which can be used in the present invention is Dantoguard Plus™ (dimethylol-5,5-dimethylhydantoin), commercially available from Lonza (Fairfield, N.J., USA).

The mildewstat or bacteriostat includes, but is not limited to, mildewstats (including non-isothiazolinones compounds) including Proxel GXL and Vantocil IB, from Avecia Corporation, Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, and Neolone M-10, all available from Rohm and Haas Company; BRONOPOL, a 2-bromo-2-nitropropane 1,3 diol, from Boots Company Ltd., PROXEL CRL, a propyl-p-hydroxybenzoate, from ICI PLC; NIPASOL M, an o-phenyl-phenol, sodium salt, from Nipa Laboratories Ltd., DOWICIDE A, a 1,2-Benzoisothiazolin-3-one, Dowacil 75, and Bioban, all from Dow Chemical Co., and IRGASAN DP 200, a 2,4,4'-trichloro-2-hydroxydiphenylether, from Ciba-Geigy A.G, and Surcide P from Surety Laboratories.

In suitable embodiments, the preservative comprises 0.0001% by weight to about 1% by weight, or 0.001% by weight to about 0.5% by weight, or alternatively 0.01% by weight to about 0.5% by weight of the inventive composition.

Antimicrobial Agent

Antimicrobial agents include quaternary ammonium compounds and phenolics. Non-limiting examples of these quaternary compounds include benzalkonium chlorides and/or substituted benzalkonium chlorides, di($C_6$-$C_{14}$)alkyl di short chain ($C_{1-4}$ alkyl and/or hydroxyalkl) quaternary ammonium salts, N-(3-chloroallyl)hexaminium chlorides, benzethonium chloride, methylbenzethonium chloride, and cetylpyridinium chloride. Other quaternary compounds include the group consisting of dialkyldimethyl ammonium chlorides, alkyl dimethylbenzylammonium chlorides, dialkylmethylbenzylammonium chlorides, and mixtures thereof, wherein the alkyl radicals may be C1 to C24. Biguanide antimicrobial actives including, but not limited to polyhexamethylene biguanide hydrochloride, p-chlorophenyl biguanide; 4-chlorobenzhydryl biguanide, halogenated hexidine such as, but not limited to, chlorhexidine (1,1'-hexamethylene-bis-5-(4-chlorophenyl biguanide) and its salts are also in this class.

In suitable embodiments, the antimicrobial comprises 0.0001% by weight to about 10% by weight, or 0.001% by weight to about 5% by weight, or alternatively 0.01% by weight to about 2.5% by weight of the inventive composition.

Propellant

It may be desirable to employ the present invention in the form of an aerosol, particularly in a pressurized aerosol container employing a compressed gas or fluid to serve as a propellant system. Suitable propellants included compressible gases, including but not limited to air, nitrogen, argon, helium, carbon dioxide, nitrous oxide, and mixtures thereof. Suitable propellants include those standard aerosols known in the art as "LPG" or "liquid petroleum gas" propellants. Examples include, but are not limited to those commonly designated as LPG A-46, LPG A-70, LPG A-108 and their mixtures and combinations with other aerosols. LPG consists of high purity hydrocarbons derived directly from oil wells, and as a by-product from the petroleum industry, consisting essentially of a mixture of propane, isobutane and n-butane. Other common volatile organic compounds and their derivatives may suitably be employed, including dialkyl ethers, such as dimethyl ether and diethyl ether and the petroleum ethers.

Volatile organic compounds may also be suitably employed as propellants, include the alkane series from methane, propane, butane, pentane and hexane and all of their respective isomers, and mixtures thereof, alone and in combinations thereof. Propellants offering improved safety in terms of reduced or non-flammability are also suitable, and include such liquid propellants as those based on chlorofluorocarbons, even though it is realized that the chlorofluorocarbons are no longer generally used due to environmental considerations. Suitable alternatives, believed to be less harmful to the earth's environment and ozone layer, include non-halogenated and partially halogenated materials, such as hydrofluorocarbons (HFC), hydrofluoroalkanes (HFA) and hydrochloroalkanes (HCA) and hydrochloro-fluorocarbons (HCFC). Some examples include, but are not limited to HFC-125, HFC-134a, HFC-152a, HFC-227ea, HFC-245fa and HCFC-22. Also suitable are aerosol propellants approved by SNAP, under the United States Environmental Protection Agency (US-EPA) Significant New Alternatives Policy (detailed in Section 612 of the Clean Air Act), which includes oxygenated organic solvents (esters, ethers, alcohols) chlorinated solvents (trichloroethylene, perchloroethylene, methylene chloride), trans-1,2-dichloroethylene, hydrofluoroether (HFE) 7100 and HFE 7200, monochlorotoluenes and benzotrifluorides, (subject to a 50 ppm workplace standard for monochlorotoluenes and a 100 ppm standard for benzotrifluoride), HFC-4310mee (subject to a 200 ppm time-weighted average workplace exposure standard and 400 ppm workplace exposure ceiling HFC-365mfc), HCFC-225ca/cb, perfluorocarbons (PFCs) and perfluoropolyethers (PFPEs) (subject to need with no reasonable alternatives found sufficient for intended end use applications), HCFC-141b, terpenes, C5-C20 petroleum hydrocarbons, and HFC-245fa.

When an aerosol formulation is employed, one or more corrosion inhibitors known in the art are included in the formulations to protect metal portions of the pressurized system, including the can, valve, valve spring, nozzle and components of the aerosol package and dispenser assembly.

In suitable embodiments, the propellant comprises 1% by weight to about 90% by weight, or 2% by weight to about 80% by weight, or alternatively 5% by weight to about 70% by weight of the inventive composition.

Water

Since the composition is an aqueous composition, water can be, along with a solvent, a predominant ingredient. The water may be deionized, industrial soft water, or any suitable grade of water.

The water should be present at a level of greater than 80% by weight, more preferably 85% to about 98% by weight, and most preferably, 90% to about 95% by weight. Where the inventive composition is concentrated, the water may be present in the composition at a concentration of less than about 80% by weight.

Processing

The composition of this invention can be prepared without the need of any solubilizing aid, dispersing aid, solvent, surfactant, or emulsifier or dispersant other than as described herein, to form an aqueous dispersion of the silicone oil in water which exhibits a rheological Critical Strain value greater than zero and less than about 0.5. Processing the composition of the present invention can be achieved using conventional low shear and/or high shear mixing techniques know in the art. Processing of the inventive composition generally does not require the use of high energy mixing techniques, such as high shear mixing, emulsification, sonication, ultrasonication, heated processing or use of stator/rotor mixers. High shear mixing processes can be employed if desired, but are not required owing to the unique rheological properties of the inventive composition in order to achieve a stable dispersion.

The higher shear mixing processes may be employed for purposes of shortening the process time, however, since the additional mixing energy and heat introduced by these energetic processes typically result in faster processing rates, particularly with larger volumes of materials. However, the high shear mixing processes generally require additional energy and more complicated machinery and equipment, both more costly to use and maintain in an industrial or manufacturing environment. In some instances, high shear mixing may have detrimental effects on polymers and other susceptible components of the composition, particularly optional adjuncts added to provide additional benefits or functionalities to the finished composition, and may not be desirable as the sole mixing process. Hence, high shear processes can be used.

Alternatively, lower energy and low shear mixing techniques, such as agitation, paddle, blade, vortex and helical screw mixing are generally found sufficient for processing the composition of the present invention in order to achieve a stable dispersion. The low shear mixing techniques lend themselves to both batch and dynamic mixing, or continuous and static mixing approaches for commercial scale preparation of the inventive composition. Generally, an agitator is employed for low shear mixing in batch modes that is, processing of compositions in a single tank, typically in larger volume tanks exceeding several hundreds or thousands of gallons in fluid capacity. For low shear mixing in continuous modes, low shear static mixing, employing in-line helical and vortex mixer elements, which produce laminar and turbulent mixing streams, respectively, are generally employed.

In continuous mixing modes, the various raw materials are introduced to a continuous fluid stream of the most predominant raw material, typically the water component. The introduction is generally performed using multiple inlets each dispensing a proportioned amount of material at a rate of introduction adjusted to approximate the desired volume percentage or gravimetric weight percentage of each material in the final composition. The introduction can be via multiple inlets directly into the continuous fluid stream, or via one or more inlets following premix or batch premixing of any two or more compatible components. Thus, suitably compatible components may optionally be combined in smaller premixes or batches prior to introduction into the continuous mixer for ease of handling and processing. The introduction can be simultaneous, that is to say all proportioned materials introduced in the same zone of the continuous mixer, preferably before the shear mixer stage of the continuous mixer, or introduced in separate or multiple zones of the continuous mixer, with or without separate or multiple mixing zones between the inlets. Thus, the inventive composition may be formed using a continuous process configured in any number of equally suitable configurations of component inlet, mixing and flow stages. Generally, the specific configuration is selected to best match available equipment and the desired properties of the final composition in order to achieve the most efficient continuous process.

Batch mode processing can also be suitably employed to prepare the aqueous dispersion of the current invention. Batch mode processing has some advantages, particularly in that some polymers used in the current invention may require a pre-hydration step, sometimes known in the art as "wetting" or "wetting out", prior to further mixing steps, and can generally be performed in the same bulk tank that the remainder of the batch process, i.e. introduction and subsequent mixing of the remaining components of the composition, is conducted in. However, the pre-hydration step may be done in advance of a continuous mixing process, such that the feed stream of the polymer to the continuous mixer system is that of the "wetted" out polymer in aqueous solution.

Typically, the order of processing of the composition of the present invention, for example, in a batch mode process, begins with introduction of water into a batch tank sufficient to cover the mixer blades to a depth so that slow agitation may be begun without splashing, cavitation or introduction of air into the stirred liquid. A biocide or preservative is sometimes introduced next in the process to control microorganisms, but this is optional, and may or may not be required depending on the quality of the water and ingredients employed, or can be added at any later step in the process, or after the dispersion process is complete. The crosslinked acrylic polymer, either in a powdered, pre-concentrated or liquid solution or dispersion form, is generally added next to the stirred batch water. The speed of introduction will depend somewhat on the form of the polymer used (i.e. powder or liquid) and it's handling properties and equipment available to the operator. Generally, the speed of introduction is maximized for commercial processes for efficiency, although the formation of concentrated regions, clumps or insufficiently wetted powder during the introduction is undesirable, and the speed of introduction is typically adjusted to avoid these undesirable conditions. Once the entire charge of the crosslinked acrylic polymer has been introduced, further mixing is continued for a short time, generally 10 to 60 minutes to fully hydrate or "wet out" the crosslinked acrylic polymer material. Adjustments to the batch pH and/or acidity or alkalinity level are generally done following this step in the mixing process, in order to at least partially neutralize ionizable anionic polymers, or those anionic polymers known to be alkali swellable, or optionally pH adjustments may be made later in the process, or pH adjusted at any subsequent desired step, or partially adjusted at any subsequent step until the final desired pH of the finished composition, that is the composition with all essential materials and any optional materials added, is achieved. Generally an acid or alkalizing agent is employed, being any suitable material with the capability to either lower or raise the pH of the solution from its native or unadjusted solution pH (typically depending on the polymer and the form in which it is supplied), to the desired solution pH.

For nonionic (neutral and/or non-ionizable) and/or cationic polymers, adjustments to the batch pH and/or acidity or alkalinity level are optionally, and such optional pH adjustment can be done at the step following polymer addition to water, or at a subsequent step in the process. Any desired solution pH may be employed in the inventive compositions employing neutral and cationic polymers, generally including the range of about pH 1 to about pH 13. In practice, the pH may optionally be adjusted at any step prior to introduction of any sensitive ingredients to the composition that would otherwise be chemically or physically compromised if the pH of the batch in progress was not adjusted. Optionally, in some embodiments of the invention employing neutral or cationic polymers, the pH of the polymer solution is not adjusted.

Following the "wetting out" step and/or neutralization step, the organopoly-siloxane or silicone oil component is added next, although it may also be added at a later step, for example after the addition of other additives or adjuncts. The speed of introduction of the silicone oil component is generally less subject to problems, but the dispersion process takes some time to fully develop so too fast an addition will generally result in a separating phase, depending on the relative densities of the silicone oil to that of the batch solution, either forming on the top or bottom of the batch tank and reducing the dispersion efficiency. Thus, in general, introduction of the silicone component is adjusted so that the introduction speed is approximately equivalent to the speed of formation of the dispersion to prevent excessive separation in the mixing tank. As the silicone oil component is generally more hydrophobic than the aqueous phase, less water soluble or water insoluble components of the composition, such optional adjuncts as described herein, may optionally be premixed with the silicone oil component prior to the dispersion process step. This approach generally provides for more uniform and stable inclusions of the less water soluble or water insoluble components desired to be present, rather than introducing them separately and/or at a later step in the process following the silicone oil dispersion process step, although these may also alternatively be added at an earlier step or a later step following the silicone oil addition. The silicone oil addition step may also alternatively be conducted in a continuous process operation as described herein. Following the silicone oil addition step, whether conducted in a batch or continuous process, a stable dispersion is created that will retain the silicone oil without significant separation suitable for immediate use and/or use following extended storage times. In general, the mixing process employed, including but not limited to those described herein for producing the silicone oil dispersions of the present invention, is sufficient to provide silicone oil dispersions wherein the dispersed silicone oil phase has an average particle size distribution around and/or below 500 microns.

Silicone dispersions of the present invention having average particle size distributions around and/or below about 500 microns are found to have suitable stability and performance attributes during storage and use. Particle size can be measured during the mixing process to ensure that the particle size of the dispersed silicone oil phase is within the desired range, or measured after processing. In one embodiment of the invention, the aqueous dispersion of this invention has a relatively small particle size, for example, in the range of 10 nm to 1000 nm, more preferably in the range of 100 nm to 800 nm, and most preferably in the range of 200 nm to 450 nm.

Additional mixing, extended mixing time, and/or mixing with increased shearing or increased temperature may suitably be employed to further reduce the average particle size distribution of the inventive compositions to around and/or below about 500 microns. Further reduction of the particle size can optionally be performed by mixing techniques as described herein at any subsequent stage of the process, such as for example, after other additives and adjuncts have been added, or for example, during their addition. Alternatively, selected mixing techniques, such as for example, low shear and low energy mixing processes, can be employed at any subsequent stage of the process to introduce other additives and adjuncts to the compositions of the present invention without substantially changing the effective average particle size distribution of the dispersed silicone oil phase. Thus, a variety of mixing and processing techniques may be employed to achieve the desired average particle size distribution of the dispersed silicone oil phase in the inventive compositions, and these mixing and processing techniques may be employed in any order following the first preparation of the dispersions.

Once the silicone oil dispersions are formed, subsequent processing may optionally be employed, including introduction of other optional adjuncts, such as for example, but not limited to, introduction of solvents, surfactants, surface wetting agents, spreading agents, stabilizers, ultraviolet absorbers, ultraviolet light scatterers, ultraviolet blockers, pigments, dyes, coloring agents, preservatives, microbiocides, fungicides, plasticizers, alkalinity agents, buffers, pH adjusting acids, bases and their conjugate salts, fragrances, polishes, abrasives, wax, lubricants, thickening agents, nanoparticulate materials and mixtures thereof. Alternatively, the optional adjuncts may be added to the composition prior to the silicone oil addition, or alternatively at any later step in the process. In continuous process, the optional adjuncts may be introduced simultaneously with the silicone oil, or alternatively proceed addition of the silicone oil, or yet alternatively be added after the silicone oil.

The silicone dispersions are sufficiently robust to allow additional further processing and handling typical to a manufacturing or commercial process, such as pumping, fluid transfer, tank charging, batching, dispensing and filling operations generally employed to make, transfer, store and package compositions for distribution and use. In one embodiment, the silicone dispersions may be milky white and/or opaque in appearance in their packaging or bottle and the emulsion will break upon spraying or upon application to the treated surface, forming a clear, glossy coating. In another embodiment of the invention, the silicone dispersion may be transparent in appearance in the packaging or bottle and also transparent when it is sprayed or applied to the desired surface. Typically the transparent silicone dispersion is achieved by selecting solvents which have a similar refractive index to that of the polyorganosiloxane are used to make the inventive composition transparent or clear. By matching the refractive indices of the two phases in the aqueous dispersion transparency may be achieved. Suitable solvents which fall within the refractive index range polyorganosiloxane, which is about 1.4 to 1.5, include but are not limited to, glycerin and sorbitol.

It is to be understood that other mixing processes, and the order in which the mixing steps are conducted, can be varied to some extent, and other processes known in the art employed to prepare the compositions of the present invention.

Method of Use and Application

The stable dispersions of the present invention have a wide number of applications such as in automotive care applications, home care applications, personal care applications, industrial and institutional applications, pharmaceutical applications, textile applications, and the like. The inventive compositions can be used for treating a host of inanimate surfaces, including but not limited to hard and soft surfaces found throughout the interior and exterior of the household and automotive areas. Household surfaces on which the stable dispersions of the present invention can be used include floors, counter tops, furniture, walls and surfaces constructed of glass, plastic, fiberglass, laminates, such as Formica™ and Corian™, tile, porcelain, brick, concrete, limestone, grout, marble, granite as well as metallic surfaces such as aluminum, steel, stainless steel, iron, chrome, copper, brass and the like. Other household surfaces include carpet, upholstery, vinyl, leather, textiles, fabric, floors, walls, ceilings and wall finishes, such as wall paper, painted surfaces and panels. Automotive surfaces on which the stable dispersions of the present invention may be used include tires, rubber, vinyl, fabric, plastic and general elastomer surfaces found on the exterior and interior of a boat, vehicle, automobile, bus, car, plane, motorcycle and the like.

A second aspect of the present invention is directed to a method of using the aqueous dispersion of this invention to enhance shine or gloss in elastomeric surfaces, involving:
(1) applying an effective amount of the aqueous dispersion to an elastomeric surface; and
(2) distributing the dispersion onto the surface with an application implement.

The aqueous dispersion is may be applied by spraying onto the surface.

In one embodiment, the elastomeric surface is vinyl or rubber. More preferably, the elastomeric surface is an automotive surface including but not limited to tires, rubber, leather, vinyl, fabric, plastic and other elastomic surfaces.

In addition to enhancing shine in elastomeric surfaces, the aqueous dispersion of this invention will also clean, protect and preserve such surfaces.

Although spraying the composition onto the surface is the preferred method of application, the composition of this invention may be applied to the target surface by a variety of means, including via a wash, dip or immersion process. The composition may be applied by means of a carrier such as, e.g., an impregnated wipe, foam, sponge, cloth, towel, tissue or paper towel or similar releasably absorbent carrier that enables the inventive composition to be applied by direct physical contact and transferred from the carrier to the target surface, generally during a spreading, padding, rubbing or wiping operation. Combinations of a direct application, followed by a spreading, padding, rubbing or wiping operation performed with the aid of a foam, sponge, cloth, towel, tissue or paper towel, squeegee or similar wiping implement is also suitable for applying the composition of the present invention.

In one embodiment, the composition of the present invention is sprayed directly onto the target surface and therefore is typically packaged in a spray dispenser. The spray dispenser can be any of the manually activated means for producing a spray of liquid droplets as is known in the art, e.g. trigger-type, pump-type, electrical spray, hydraulic nozzle, sonic nebulizer, high pressure fog nozzle, non-aerosol self-pressurized, and aerosol-type spray means. Automatic activated means can also be used herein. These types of automatic means are similar to manually activated means with the exception that the propellant is replaced by a compressor.

The spray dispenser can be an aerosol dispenser. Said aerosol dispenser comprises a container which can be constructed of any of the conventional materials employed in fabricating aerosol containers. The dispenser must be capable of withstanding internal pressure in the range of from about 5 to about 120 p.s.i.g. (pounds per square inch gas), more preferably from about 10 to about 100 p.s.i.g. The one important requirement concerning the dispenser is that it be provided with a valve member which will permit the inventive composition contained in the dispenser to be dispensed in the form of a spray of fine, or finely divided, particles or droplets. The aerosol dispenser utilizes a pressurized sealed container from which the inventive composition is dispensed through a special actuator/valve assembly under pressure. The aerosol dispenser is pressurized by incorporating therein a gaseous component generally known as a propellant. A more complete description of commercially available aerosol-spray dispensers appears in U.S. Pat. No. 3,436,772, Stebbins; and U.S. Pat. No. 3,600,325, Kaufman et al.; both of which are incorporated herein by reference.

Alternatively the spray dispenser can be a self-pressurized non-aerosol container having a convoluted liner and an elastomeric sleeve. Said self-pressurized dispenser comprises a liner/sleeve assembly containing a thin, flexible radially expandable convoluted plastic liner of from about 0.010 to about 0.020 inch thick, inside an essentially cylindrical elastomeric sleeve. The liner/sleeve is capable of holding a substantial quantity of the inventive composition and of causing said product to be dispensed. A more complete description of self-pressurized spray dispensers can be found in U.S. Pat. No. 5,111,971, Winer, and U.S. Pat. No. 5,232,126, Winer; both of which are herein incorporated by reference.

Another type of aerosol spray dispenser is one wherein a barrier separates the inventive composition from the propellant (preferably compressed air or nitrogen), as is disclosed in U.S. Pat. No. 4,260,110, incorporated herein by reference. Such a dispenser is available from EP Spray Systems, East Hanover, N.J.

In another embodiment, the spray dispenser is a non-aerosol, manually activated, pump-spray dispenser. Said pump-spray dispenser comprises a container and a pump mechanism which securely screws or snaps onto the container. The container comprises a vessel for containing the inventive composition to be dispensed. The pump mechanism comprises a pump chamber of substantially fixed volume, having an opening at the inner end thereof. Within the pump chamber is located a pump stem having a piston on the end thereof disposed for reciprocal motion in the pump chamber. The pump stem has a passageway there through with a dispensing outlet at the outer end of the passageway and an axial inlet port located inwardly thereof.

The container and the pump mechanism can be constructed of any conventional material employed in fabricating pump-spray dispensers, including, but not limited to: polyethylene; polypropylene; polyethyleneterephthalate; blends of polyethylene, vinyl acetate, and rubber elastomer. Other materials can include stainless steel. A more complete disclosure of commercially available dispensing devices appears in: U.S. Pat. No. 4,895,279, Schultz; U.S. Pat. No. 4,735,347, Schultz et al.; and U.S. Pat. No. 4,274,560, Carter; all of said references are herein incorporated by reference.

Most preferably, the spray dispenser is a manually activated trigger-spray dispenser. Said trigger-spray dispenser comprises a container and a trigger both of which can be constructed of any of the conventional material employed in fabricating trigger-spray dispensers, including, but not limited to: polyethylene; polypropylene; polyacetal; polycarbonate; polyethylene-terephthalate; polyvinyl chloride; polystyrene; blends of polyethylene, vinyl acetate, and rubber elastomer. Other materials can include stainless steel and glass. The trigger-spray dispenser does not incorporate a propellant gas. The trigger-spray dispenser herein is typically one which acts upon a discrete amount of the inventive composition itself, typically by means of a piston or a collapsing bellows that displaces the composition through a nozzle to create a spray of thin liquid. Said trigger-spray dispenser typically comprises a pump chamber having either a piston or bellows which is movable through a limited stroke response to the trigger for varying the volume of said pump chamber. This pump chamber or bellows chamber collects and holds the product for dispensing. The trigger spray dispenser typically has an outlet check valve for blocking communication and flow of fluid through the nozzle and is responsive to the pressure inside the chamber. For the piston type trigger sprayers, as the trigger is compressed, it acts on the fluid in the chamber and the spring, increasing the pressure on the fluid. For the bellows spray dispenser, as the bellows is compressed, the pressure increases on the fluid. The increase in fluid pressure in either trigger spray dispenser acts to open the top outlet check valve. The top valve allows the product to be forced through the swirl chamber and out the nozzle to form a discharge pattern. An adjustable nozzle cap can be used to vary the pattern of the fluid dispensed. For the piston spray dispenser, as the trigger is released, the spring acts on the piston to return it to its original position. For the bellows spray dispenser, the bellows acts as the spring to return to its original position. This action causes a vacuum in the chamber. The responding fluid acts to close the outlet valve while opening the inlet valve drawing product up to the chamber from the reservoir.

A more complete disclosure of commercially available dispensing devices appears in U.S. Pat. No. 4,082,223, Nozawa; U.S. Pat. No. 4,161,288, McKinney; U.S. Pat. No. 4,434,917, Saito et al.; U.S. Pat. No. 4,819,835, Tasaki; and U.S. Pat. No. 5,303,867, Peterson; all of said references are incorporated herein by reference. A broad array of trigger sprayers or finger pump sprayers are suitable for use with the compositions of this invention. These are readily available from suppliers such as Calmar, Inc., City of Industry, Calif.; CSI (Continental Sprayers, Inc.), St. Peters, Mo.; Berry Plastics Corp., Evansville, Ind.; or Seaquest Dispensing, Cary, Ill.

In one embodiment of the invention, the silicone dispersion composition comprises a wetting agent which enables the composition to be self-leveling and spread over the treated surface uniformly. The silicone dispersion composition which is self-leveling may be preferably sprayed on a surface without the need for touching or wiping the treated surface creating a no-touch application. The no-touch application is easy for a user to apply a uniform coating quickly with limited mess or cleanup. In addition, the no-touch application is beneficial to the user because al the formulation is applied to the surface and there is no formulation which is lost by being absorbed on a carrier or absorbent applicator.

The present invention and benefits of using the aqueous dispersion of this invention are more particularly described in the following examples and claims.

RESULTS AND DISCUSSION

Rheological Parameters

Without being bound by theory, it is believed that the systems of the present invention contain a sufficient concentration of dispersed particles or dispersed particle-like components to form a composition-spanning three-dimensional network at rest. Such a particle network can be formed by various types of structural building blocks, including, but not limited to, hydrated polymer molecules. Hydrated polymer molecules are commonly exhibited from a variety of partially water soluble or water or alkaline hydratable polymers, including, but not limited to, water-swellable and alkali-swellable polymers, copolymers and terpolymers, and biopolymers as described herein. For example, the loosely interconnected rigid rods formed by the helical regions of Xanthan gum in solution form are believed to form such composition-spanning three-dimensional networks.

A further property of these composition-spanning particle networks in the systems of the present invention is that they store energy elastically, that is to say reversibly, at small deformations, but break down and become flowable when the applied deformation exceeds a critical value. This is typical of moderately concentrated emulsions and dispersions, such as creamy salad dressing and ketchup. This is in contrast to thick, but Newtonian fluids, such as honey, which have no elastic response and flow under all conditions, however slowly this flow may be. This is also in contrast to elastic fluids, which are viscous and flow like a liquid under slow deformation, but are also elastic and behave like a springy solid under fast deformation, such as Silly Putty™.

The rheological behavior of the inventive systems can be identified and characterized by their viscoelastic response to an applied sinusoidal oscillation of either strain (displacement) or stress (force) at constant frequency. In a strain sweep, applied strain is varied and stress is measured, whereas in a stress sweep, applied stress is varied and strain is measured. The choice of experiment depends on the preference of the experimenter or on the type of rheometer available, but results are essentially equivalent between the two modes of measurement. In other words, if the output variables from a stress sweep are plotted as a function of strain, the resultant measured data curves should be comparable to those obtained from a strain sweep. Output variables include the magnitude of the complex modulus $G^*$ (the maximum stress amplitude divided by the maximum strain amplitude), the phase angle $\delta$ (the phase shift between strain and stress waves), the Elastic Modulus $G'$ and viscous modulus $G''$ (the in-phase and out-of phase components of $G^*$, or $|G^*|\cos\delta$ and $|G^*|\sin\delta$, respectively).

Critical Strain and Elastic Modulus Parameters

For systems of the present invention, which are stabilized by a particle network, the rheological variables are constant at small strains, but start to change when the strain exceeds a certain value called the Critical Strain value, or $\gamma_o$; in particular, the Elastic Modulus value $G'$ decreases and the phase angle $\delta$ increases above the Critical Stain value $\gamma_o$. At strains below the Critical Strain value $\gamma_o$ (defined as the linear viscoelastic region of the system), the network exhibits a consistent degree of elasticity, and stretches but does not break down. At strains above the Critical Strain value $\gamma_o$, the decrease in $G'$ and increase in $\delta$ signify breakdown of the particle network and initiation of dispersive flow. A further property of these network-stabilized systems is that the strain behavior just described is relatively invariant to the frequency of the oscillation. This is in contrast to elastic fluids, which may show strain behavior resembling that described above at high frequencies, while showing Newtonian behavior, where the rheological parameters reflect only viscous flow at all strains and $\gamma_o$ is undefined at low frequencies.

For systems of the present invention, the consistent elastic response at low strains relates to an ability to keep dispersed silicone oil droplets apart and in suspension, whereas a decrease in the elastic response with increasing energy input allows for the material to flow and release the silicone oil droplets. Note that the existence of a Critical Strain value implicates the existence of a linear viscoelastic region, and furthermore, that the value of $G'$ in the linear viscoelastic region must be greater than zero, since this parameter decreases outside of the linear viscoelastic region. The existence of a Critical Strain value that does not vanish (i.e. exhibit zero or negative value) at low frequency is therefore definitive of dispersion with an at-rest structure that can trap and stabilize the silicone oil droplets.

A convenient way to rheologically characterize these network-stabilized systems of the current invention is by the Critical Strain value $\gamma_o$ and by the Elastic Modulus value $G'$ in the linear viscoelastic region. For the systems of the invention, the Critical Strain value ranges from greater than zero to about 0.5 (dimensionless units), and the Elastic Modulus value in the linear viscoelastic region ranges from greater than zero to about 400 Pascals. Typical examples of the instrumental sweeps and resultant data are shown in FIG. 1.

The Critical Strain value thus represents the degree to which the sample must be deformed in order to initiate structural breakdown. Without being bound by theory, it is believed to be reasonable to assume that the process of wiping the inventive dispersions onto a surface or wiping after application, results in a certain degree of localized strain at the surface, although the non-uniformity of both the compositions and the surfaces in question precludes making simple extrapolations to the bulk properties measured in the rheometer. Inventive dispersions with a Critical Strain value greater than zero and less than about 0.5 require only a minimal deformation force to rupture the dispersion and thereby allowing the silicone oil to become available for initial contact and subsequent wetting of and eventual partitioning and/or coating onto the target substrate, thereby resulting in the desired treatment characteristics of preserving, protecting, coating, and restoring appearance and shine to the treated substrate surfaces. Dispersions with a Critical Strain value greater than about 0.5 require an excessive deformation force, not typically achieved by manual forces associated with wiping actions, and are therefore less likely to allow the silicone oil droplets to make the initial contact with the surface that is necessary for silicone wetting to occur. The value of $G'$ in the linear viscoelastic region gives an indication of the ability of the network to resist structural rearrangement. It will be shown below that this value of $G'$ can be linked to the tendency of the network to hold its form under gravity.

Measurement Technique

Stress Sweeps were performed on the Stresstech High Resolution Rheometer, using the CC 25 cup and bob measuring system at 25° C., at a frequency of 1 Hz. Each sample was premixed by gently rotating the container upside down a few times. The sample was then carefully poured into the rheometer cup, and large bubbles were removed using a pipette. No other sample preparation or equilibration techniques were employed. Starting and ending stresses varied depending on the sample, and were adjusted to cover a sufficient stretch of both the linear viscoelastic region and the region of network break-down.

Particle size measurements were conducted on compositions of the present invention to determine average particle size distributions of the systems. Measurements were performed using a Nikon Model SMZ Light Microscope equipped with a Nikon digital camera, model DXM 1200F outfitted with the following: Objective Lens: HR Plan APO 1X WD 54; and Eyepiece Lens: C-W10X FN 22 (focal length 22 mm). Image processing was done using NI IMAQ Vision Builder 6.1 software with the digital picture input obtained from the Nikon microscope equipment using bright field backlighting. Results of image analysis showed that in general for the example embodiments presented here, average particle size distributions in the inventive compositions ranged between an average particle size distribution of about 5 microns (micrometer) to about 500 microns. Visually, example compositions ranged in clarity from turbid (milky white) to nearly transparent, or translucent in appearance, depending on the level of silicone oil present. The less turbid and more transparent compositions generally exhibited higher average particle size distributions above about 1000 nanometers.

Stability

It is worthwhile to address some observations and definitions related to physical stability of the inventive compositions, particularly in regard to phase separation and utility of use following either short-term or long-term storage, and/or storage under ambient conditions and/or stressful conditions of freezing, cold storage and/or heated storage, and the various combinations of conditions which the inventive compositions could likely experience with respect to actual use. The compositions of the present invention generally are found to remain macroscopically homogeneous (that is to say one continuous non-separating phase) over many months of storage, even following repeated freeze-thaw cycles and storage under usually adverse conditions including extended storage at close to freezing temperatures (35° F.) and elevated temperatures (120° F.) and combinations of these conditions. In some instances, compositions with Elastic Modulus values in the range above zero to about 10-20 Pascals visually showed reversible separation, typically into two phases with a diffuse boundary between the two phases, within days or weeks following initial preparation. However, these separated compositions were noted to be easily reconstituted, that is to say, able to recover their original physical and performance properties, by the simple process of shaking the separated compositions by hand, or inverting the container holding the separated composition one or several times. In some instances it is desirable to formulate the inventive compositions to have a short reversible phase separation as noted herein, for the purposes of novelty in appearance or as a reminder for users to shake before use. It should be noted that for all examples for which rheological measurements were made, the compositions were macroscopically homogeneous for the duration of the experiment. Hence, upon reconstitution, even previously separated compositions continue to exhibit the same values of the characteristic rheological parameters of the inventive compositions, the Critical Strain values and Elastic Modulus values as described herein.

Some embodiments of the inventive compositions with Elastic Modulus values below about 20 Pascals may reversibly separate into two phases and may require an extra step of mixing or shaking before use. Such embodiments may suitably be employed however since their functionality and useful properties are maintained and their physical homogeneity (single phase) is easily regenerated with brief shaking, stirring or mixing prior to use. Embodiments of the present invention include inventive compositions exhibiting rheological Elastic Modulus values over the range of greater than zero to about 400 Pascals. Further, some compositions with values in the range above zero to about 10-20 Pascals, which in some instances show reversible separation, may be suitably employed when it is desired to produce multiple phase compositions for applications where remixing of the reversibly separated compositions just prior to use is a desired attribute. An example of such an embodiment includes but is not limited to an inventive compositions reversibly separating into two visually distinct liquid layers for appearance purposes and/or as a reminder for users to shake or remix prior to use. In general, compositions with values in the range above about 20 Pascals to about 400 Pascals remain homogeneous over a wide range of storage temperatures and storage conditions.

EXAMPLES

Examples of embodiments of the inventive compositions are provided in Tables I-VII, which presents data detailing measured rheological parameters from stress sweeps across a range of polymers and polymer levels in compositions having the indicated level of silicone oil present. Samples were prepared by low shear mixing of the silicone oil into the aqueous polymer solution, preformed and adjusted to near neutral pH, pH 6-9, in accordance to the batch mixing strategy described herein. The example compositions all exhibited suitable physical stability, and demonstrate the ability of the selected polymers to provide rheological structure to the inventive compositions sufficient to form stable silicone oil dispersions. Example No. 2 exhibited single phase stability for over ten months storage at 70° F., and over 1 month at 120° F. Example No. 3 exhibited single phase stability for about 1 day at 70° F., thereafter separating into two liquid phases. However, after gentle shaking by hand for about 5 seconds, the composition reformed into a single homogeneous liquid phase. Other examples presented in Table I all exhibited extended stability greater than about 5 months at room temperature.

TABLE I

| Example | Composition (1) | Polymer wt % (2) | Silicone Oil wt % (3) | Elastic Modulus (G') Pascals | Critical Strain (4) ($\gamma_o$) |
|---|---|---|---|---|---|
| 1 | Polymer A (5) | 0.56 | 6 | 4.1 | 0.04 |
| 2 | Polymer B (6) | 0.060 | 6 | 19 | 0.008 |
| 3 | Polymer K (7) | 0.07 | 6 | 2.4 | 0.3 |
| 4 | Polymer F2 (8) | 0.35 | 6 | 3.0 | 0.04 |
| 5 | Polymer Mix B, M (9) | 0.2 | 6 | 130 | 0.008 |
| 6 | Polymer Mix B, M (10) | 0.15 | 6 | 7.4 | 0.003 |
| 7 | Polymer B | 0.08 | 6 | 32 | 0.004 |
| 8 | Polymer B | 0.56 | 6 | 380 | 0.1 |

TABLE I-continued

| Example | Composition (1) | Polymer wt % (2) | Silicone Oil wt % (3) | Elastic Modulus (G') Pascals | Critical Strain (4) ($\gamma_o$) |
|---|---|---|---|---|---|
| 9 | Polymer J (11) | 0.052 | 7.5 | 19 | 0.004 |
| 10 | Polymer L (12) | 0.27 | 6 | 36 | 0.004 |

(1) Water comprises the balance of the composition, q.s. 100% total weight basis with approximately 0.4% triethanolamine present to adjust pH to about 7.
(2) Level of polymer on 100% active weight basis
(3) Dow Corning polydimethylsiloxane (PDMS) Silicone 200 fluid, 100% active weight basis
(4) Unitless parameter
(5) Acusol 830 alkali-swellable acrylic polymer-nonassociative Type (l) available from Rohm & Haas
(6) Carbopol EZ3 hydrophobically modified cross-linked polyacrylate powder available from Noveon
(7) Rhodopol T, a xanthan gum from Rhodia
(8) Ciba DP-HC-03-018 anionic alkali-swellable acrylic based polymer from Ciba Chemical
(9) Mixture of 0.10% by weight Carbopol EZ-3 from Noveon and 0.10% by weight Solagum SH210 from Seppic Inc.
(10) Mixture of 0.05% by weight Carbopol EZ-3 and 0.10% by weight Solagum
(11) Carbopol ETD 2691 lightly cross-linked polyacrylate polymer supplied as powder from Noveon
(12) Synergen Y02 polymer from Clariant Corporation Further examples (No.s 11 through 25) of embodiments of the inventive compositions are provided in Table II, which presents additional polymers suitable for use on hard surfaces, soft surfaces including fabrics, and automotive surfaces.

TABLE II

| Example | Composition (1) | Polymer wt % (2) | Silicone oil wt % (3) |
|---|---|---|---|
| 11 | Polymer A (4) | 0.28 | 3 |
| 12 | Polymer B (5) | 0.07 | 6 |
| 13 | Polymer B | 0.035 | 3 |
| 14 | Polymer C (6) | 0.5 | 9.5 |
| 15 | Polymer D (7) | 0.28 | 6 |
| 16 | Polymer E (8) | 0.45 | 6 |
| 17 | Polymer F1 (9) | 0.54 | 6 |
| 18 | Polymer F2 (10) | 0.57 | 6 |
| 19 | Polymer G (11) | 0.6 | 6 |
| 20 | Polymer H (12) | 0.07 | 6 |
| 21 | Polymer I (13) | 0.25 | 6 |
| 22 | Polymer I | 0.07 | 6 |
| 23 | Polymer J (14) | 0.07 | 6 |
| 24 | Polymer J (15) | 0.16 | 10.62 |
| 25 | Polymer J (16) | 0.16 | 16.62 |

(1) Water comprises the balance of the composition, q.s. 100% total weight basis with approximately 0.4% triethanolamine present to adjust pH to about 7.
(2) Level of polymer on 100% active weight basis
(3) Dow Corning Silicone 200 fluid
(4) Acusol 830
(5) Carbopol EZ3
(6) Neutralized Solagum 306 liquid dispersion polymer available from Seppic Inc.
(7) Ciba DP-HC-01-001 anionic liquid dispersion polymer with activating surfactant available from Ciba Chemicals
(8) Ciba Rheovis ATN anionic alkali-swellable acrylic based, non-associative polymer
(9) Ciba DP-HC-03-012 anionic alkali-swellable acrylic based associative Type (l) polymer
(10) Ciba DP-HC-03-018
(11) Ciba Rheovis ATA hydrophobically modified alkali swellable polymer
(12) Pemulin 1622 cross-linked copolymer of acrylic acid and C10-30 alkyl acrylate available from Noveon
(13) Carbopol 934 polyacrylate powder available from Noveon.
(14) Carbopol LTD 2691
(15) Silicone oil mixture of Dow Corning DC-200 (30,000 cst) and Dow Corning wetting agent Q2-5211 present at 0.12%
(16) Silicone oil mixture of Dow Corning DC-200 (350 cst) and Dow Corning wetting agent Q2-5211 present at 0.12%

Additional examples (No.s 16-31) of embodiments of the inventive compositions are provided in Table III, which presents example compositions suitable for use as a hard surface treating composition, particularly for cleaning and protecting metal surfaces found throughout a kitchen, such as stainless steel, aluminum and chrome surfaces.

TABLE III

| Ingredient (1) | Ex. 26 | Ex. 27 | Ex. 28 | Ex. 29 | Ex. 30 | Ex. 31 |
|---|---|---|---|---|---|---|
| Polymer A (2) | 0.50 | | | | | |
| Polymer B (3) | | 0.50 | | | | |
| Polymer J (4) | | | | 0.05 | 0.05 | 0.05 |
| Triethanoloamine (5) | 0.05 | 0.05 | 0.05 | 0.05 | 0.05 | 0.05 |
| Silicone Oil A (6) | 8 | 8 | | | | 4 |
| Silicone Oil B (7) | | | 0.25-6 | | 0.25-6 | |
| Silicone Oil C (8) | | | | 1-4 | 0-4 | 0-4 |
| Glycol ether solvent (9) | | | | 1-5 | 1-5 | 1-5 |
| Wetting Agent (10) | 0.1-2.0 | 0.1-0.2 | 0.1-2.0 | 0.1 | 0.1-0.2 | 0.1 |
| Preservative (11) | 0.1 | 0.1 | 0.1 | 0.1 | 0.1 | 0.1 |

TABLE III-continued

| Ingredient (1) | Ex. 26 | Ex. 27 | Ex. 28 | Ex. 29 | Ex. 30 | Ex. 31 |
|---|---|---|---|---|---|---|
| Fragrance Oil (12) | 0.01 | 0.01 | 0.01 | 0.01 | 0.01 | 0.01 |
| Water (13) | q.s. | q.s. | q.s. | q.s. | q.s. | q.s. |

(1) Ingredients expressed as % by weight on 100% active basis unless noted. Water represents balance of composition (q.s.) to 100%
(2) Acusol 830
(3) Carbopol EZ3
(4) Carbopol ETD 2691
(5) Base for pH adjustment to pH 6 to 8
(6) SF 1550, a polyphenylmethoylsiloxane from General Electric
(7) DC 200 of 350 cst viscosity. Lower-upper values of wt % range of ingredient in example compositions indicated.
(8) Volatile silicone oil DC 245, available from Dow Corning. Range of values in 1% increments
(9) Dowanol EB, available from Dow Chemical. Range of values in 1% increments
(10) Silwet 7280, available from General Electric, DC56 from Dow Corning for Examples 26 and 28. Lower-upper values of wt % range of ingredient in example compositions indicated.
(11) Dantogard Plus, available from the Lonza Company
(12) Commercially available fragrance oil concentrate from Givaudan-Roure
(13) Purified water with low hardness ion content Additional examples (No.s 32-38) of embodiments of the inventive compositions are provided in Table IV, which presents example compositions suitable for use as an elastomeric surface treating composition, particularly for automotive vinyl and rubber (tire) surfaces. Ex. 38 is an aerosol version of Ex. 37 including a propellant. The example compositions were sprayed using a manual trigger pump sprayer producing fine droplets onto vinyl and rubber substrates, wiped with a soft cloth to spread the composition and remove excess liquid. The aerosol version was packaged in a pressurized metal can employing a dispensing valve. Resulting surfaces exhibited a clean and shiny surface that was non-greasy to touch.

TABLE IV

| Ingredient (1) | Ex. 32 | Ex. 33 | Ex. 34 | Ex. 35 | Ex. 36 | Ex. 37 | Ex. 38 |
|---|---|---|---|---|---|---|---|
| Polymer A (2) | 0.09 | | | | | | |
| Polymer B (3) | | 0.08 | 0.09 | 0.10 | 0.05 | | |
| Polymer J (4) | | | | | | 0.05 | 0.25 | 0.25 |
| Morpholine (5) | 0.05 | 0.05 | 0.05 | 0.05 | 0.05 | 0.04 | 0.04 |
| Silicone Oil A (6) | 8 | 8 | 8 | 8 | 8 | 8 | 8 |
| Silicone Oil B (7) | | | | | | 1 | 1 |
| Mineral Spirits (8) | 2.5 | 2.5 | 2.5 | 2.5 | 2.5 | 2.5 | 2.5 |
| Wetting Agent (9) | | | | 0.03 | 0.03 | 0.05 | 0.05 |
| Propellant (10) | | | | | | | 10 |
| Preservative (11) | 0.1 | 0.1 | 0.1 | 0.1 | 0.1 | 0.1 | 0.1 |
| Fragrance Oil (12) | 0.01 | 0.01 | 0.01 | 0.01 | 0.01 | 0.01 | 0.01 |
| Water (13) | q.s. | q.s. | q.s. | q.s. | q.s. | q.s. | q.s. |

(1) Ingredients expressed as % by weight on 100% active basis unless noted. Water represents balance of composition (q.s.) to 100% by weight.
(2) Acusol 830
(3) Carbopol EZ3
(4) Carbopol ETD 2691
(5) Base for pH adjustment to about pH 7.2
(6) DC 200 PDMS fluid of 30,000 cst viscosity
(7) DC 200 PDMS fluid of 350 cst viscosity
(8) Odorless mineral spirits available from NOCO Energy Corporation
(9) Silicone Q2-5211, a super spreader from Dow Chemical
(10) Propellant A-108 available from Shell Gas Company
(11) Dantogard Plus, available from the Lonza Company
(12) Commercially available fragrance oil concentrate from Givaudan-Roure
(13) Deionized water Additional examples (No.s 39-42) of embodiments of the inventive compositions are provided in Table V, which presents example compositions suitable for use as cleaning and waxing compositions particularly suited for painted surfaces such as vehicle exteriors. The example compositions were sprayed onto lightly abraded (representative of environmental exposure and normal wear and tear) clear coated gloss black painted metal surfaces in the form of approximately 1 foot by 2 foot rectangular coupons that had been previously rinsed with tap water without drying. Compositions were then uniformly wiped across the coupon surfaces using a damp sponge and the coupons rinsed with additional tap water and dried using a soft cloth towel. The treated surfaces exhibited a clean and shiny character and readily beaded water. Further, fine scratches on the treated surfaces appeared much less noticeable to the eye, effectively restoring their appearance much closer to an original non-abraded control. The rheological parameters of the example compositions are all within the ranges characteristic of the inventive compositions. For example, rheological measurement of Ex. 40 yielded a Critical Strain value of 0.005 and an Elastic Modulus value of 190 Pa.

TABLE V

| Ingredient | Ex. 39 | Ex. 40 | Ex. 41 | Ex. 42 |
|---|---|---|---|---|
| Polymer B (1) | 0.2 | 0.20 | 0.20 | 0.20 |
| Triethanolamine (2) | 0.25 | 0.25 | 0.25 | 0.25 |
| Silicone Resin (3) | 0.2 | 0.2 | 0.1 | 0.1 |
| Silicone Oil (4) | 0.86 | 0.86 | 0.86 | 0.86 |
| Carnauba Wax (5) | — | 2.0 | 2.0 | 4.0 |
| Wettinging Agent (6) | 0.4 | 0.4 | 0.4 | 0.4 |
| Titanium Dioxide (7) | — | 0.02 | 0.04 | 0.04 |
| Preservative (8) | 0.1 | 0.1 | 0.1 | 0.1 |
| Fragrance Oil (9) | 0.01 | 0.01 | 0.01 | 0.01 |
| Water (10) | q.s. | q.s. | q.s. | q.s. |

(1) Carbopol EZ3
(2) Base for pH adjustment to about pH 7, available from Univar
(3) Dow Corning DC 2-1912
(4) DC 200 PDMS fluid of 500 cst viscosity
(5) Aqueous emulsion with 22% solids content from Knapp Inc.
(6) DC Q2-5211
(7) Opacifying colorant pigment from Degussa Corporation
(8) Dantogard Plus
(9) Fragrance concentrate from Givaudan-Roure
(10) Deionized water, q.s. to 100% balance

TABLE VI

| Ingredient (1) | Ex. 43 | Ex. 44 | Ex. 45 | Ex. 46 | Ex. 47 |
|---|---|---|---|---|---|
| Polymer K (2) | 0.080 | 0.080 | 0.080 | 0.080 | 0.080 |
| Triethanolamine (3) | 0.125 | 0.125 | 0.125 | 0.125 | 0.125 |
| Silicone Oil (4) | 9.600 | 11.500 | 13.800 | 15.00 | 9.600 |
| Preservative (5) | 0.150 | 0.150 | 0.150 | 0.150 | 0.150 |
| Wetting Agent (6) | 0.470 | 0.470 | 0.470 | 0.470 | |

TABLE VI-continued

| Ingredient (1) | Ex. 43 | Ex. 44 | Ex. 45 | Ex. 46 | Ex. 47 |
|---|---|---|---|---|---|
| Solvent (7) | | | | | 48.140 |
| Water (8) | q.s. | q.s. | q.s. | q.s. | q.s. |

(1) Ingredients expressed as % by weight on 100% active basis unless noted. Water represents balance of composition (q.s.) to 100% by weight.
(2) Carbopol ® ETD 2691 - a lightly crosslinked polyacrylic acid polymer that has been crosslinked with a polyalkenyl polyether and which is commercially available as a powder from Lubrizol Advanced Materials, Inc. (formerly Noveon, Inc.), a subsidiary of The Lubrizol Corporation
(3) TEA 99 LFG 85% - a triethanolamine commercially available from Huntsman Corporation. It contains 83-85% by weight of TEA and 13-17% by weight of water.
(4) DC-200 Fluid, 350 cSt - polydimethylsiloxane polymer (100% active) having a viscosity of 350 cSt at 25° C., commercially available from Dow Corning.
(5) Bioban ™ CS-1246 - a biocide commercially available from Dow Chemical containing 97.5% by weight of 7-ethyl bicyclooxazolidine.
(6) Q2-5211 - a low molecular weight nonionic silicone polyether wetting agent, commercially available from Dow Corning.
(7) Glycerin, USP a solvent commercially available from Young Chemical. The refractive index for glycerin is about 1.47.
(8) Deionized water, q.s. to 100% balance The aqueous dispersion of Ex. 43-Ex. 47 were prepared by pre-forming an aqueous solution of the crosslinked polyacrylic acid polymer, the pH of the solution being adjusted to near neutral pH, pH 7-9, and then low shear mixing of the silicone oil into the pre-formed aqueous solution. Like the examples in Tables I-V, the aqueous dispersions of Ex. 43-Ex. 47, have Critical Strain value ranges from greater than zero to about 0.5 (dimensionless units), and the Elastic Modulus value in the linear viscoelastic region ranges from greater than zero to about 400 Pascals.

Comparative Examples A-C

The inventive formulations, Ex. 43-Ex. 46, were compared to commercially available tire shine formulations, Examples A-C. Example A is Armor All® Extreme Tire Shine (ETS) Trigger Sprayer formulation which is commercially available from Armor All a division of The Clorox® Company. Example B is Black Magic® Tire Wet™ Trigger Sprayer which is commercially available from Black Magic. Example C is Meguiar's Hot Shine™ Tire Spray which is commercially available from Meguiar's.

Gloss Data for Example 43 and Comparative Examples A-C

In Ex. 43 and Comparative Examples A-C, the aqueous dispersions prepared in Ex. 43 and Comparative Examples A-C, respectively, were each applied to a tire surface. The gloss of each treated tire surface was then measured at two angles, 60° and 85°, using a Byk glossmeter. In addition the gloss was also measured after treating the tire with each of the formulations and leaving the treated tire outside, exposed to the weather and elements for 5 days. For each gloss measurement the measurement was taken three times at each temperature and the values in Table VII are averages of the measurement at each temperature. The results are shown in Table VII.

The gloss data in Table VII shows that Ex. 43 which only contains 9.6% by weight of silicone oil has better gloss performance at both temperatures and than Examples A-C, which are commercially available tire shine formulations, as described above. In addition Ex. 44-46, which contain slightly higher levels of silicone oil than ex. 43, also show excellent performance in all three categories in comparison with Examples A-C. Overall, Table VII shows that the inventive formulations, Ex. 43-46, outperform the comparative tire shine formulations, Examples A-C even at the lowest level of silicone oil. The gloss measurements improve in the inventive formulations as the level of silicone oil increases, but so does the cost of the formulation. Table VII shows that the inventive formulations can have less than 20% of silicone oil, less than about 15% silicone oil, or even less than about 10% silicone oil and still maintain high levels of gloss.

TABLE VII

Gloss Measurements

| Examples | Gloss at 60° F. | Gloss at 85° F. | Gloss after 5 Days |
|---|---|---|---|
| Ex. 43 | 31.5 | 18.3 | 30.6 |
| Ex. 44 | 39.4 | 31.4 | 33.8 |
| Ex. 45 | 44.2 | 32.3 | 35.7 |
| Ex. 46 | 46.1 | 33.3 | 34.2 |
| Example A (Armor All ETS) | 23.7 | 11.1 | 24.8 |
| Example B (Black Magic Tire Wet) | 29.1 | 13.5 | 27.8 |
| Example C (Meguiar's Hot Shine) | 31.3 | 18.3 | 26.5 |

What is claimed is:

1. A sprayable water-based composition for enhancing shine or gloss in an elastomeric surface, the composition being in the form of an aqueous dispersion comprising:
   (a) from about 0.1% to about 20% by weight of at least one polydiorganosiloxane fluid;
   (b) from about 0.02 to about 2.0% by weight of an alkali-swellable acrylic homopolymer crosslinked with a polyalkenyl polyether or an alkali-swellable acrylic copolymer crosslinked with a polyalkenyl polyether;
   (c) from about 85% to about 98% by weight of water;
   (d) one or more solvents wherein the composition only contains solvents which have a refractive index of about 1.4 to about 1.5; and
   (e) from about 0.10 to about 1.0% of a silicone wetting agent for reducing surface tension when dissolved in water or a water solution.

2. A composition according to claim 1, wherein the alkali-swellable acrylic polymer or copolymer is present at a level of from about 0.05% to about 0.10% by weight of the composition.

3. A composition according to claim 1, wherein the at least one polydiorganosiloxane fluid is selected from the group consisting of silicone oils having the general formula:

$$(R_nSiO_{((4-n)/2)})_m$$

wherein n is between 0 and 3, m is 2 or greater, and R is selected from the group consisting of alkyl, alkylene, allyl, aryl, benzyl, phenyl, amine, amide, vinyl, fluoroalkyl, perfluoroalkane, carboxyester and quaternary alkyl ammonium radicals, and mixtures thereof.

4. A composition according to claim 3, wherein the polydiorganosiloxane fluid is selected from the group consisting of polydimethylsiloxane, polydiethylsiloxane, polymethylphenylsiloxane, polyalkylarylsiloxane, polyethylene-oxydialkylsiloxane, polypropylene-oxydialkylsiloxane, polydialkylcyclosiloxane and mixtures thereof.

5. A composition according to claim 1, wherein the polydiorganosiloxane fluid is a polydimethylsiloxane fluid having a viscosity of from about 2 to about 60,000 centistokes at 25° C.

6. A composition according to claim 1, wherein the wetting agent comprises a silicone polyether.

7. A composition according to claim 1, wherein the composition further comprises one or more buffers or pH adjusting agents.

8. A composition according to claim 1, wherein the solvent is selected from the group consisting of: glycerin, sorbitol, and combinations or mixtures thereof.

9. A method of enhancing shine or gloss in an elastomeric surface, comprising:
(1) applying an effective amount of the composition of claim 1 to said surface; and
(2) distributing said composition onto said surface with a sprayer.

10. A method according to claim 9, wherein the polydiorganosiloxane fluid comprises a polydimethylsiloxane fluid having a viscosity of from about 300 to about 400 centistokes at 25° C.

11. A method according to claim 9, wherein the water-based composition is self-leveling and does not require any touching or wiping to spread the composition over the surface evenly.

12. A method according to claim 9, wherein the elastomeric surface comprises rubber or vinyl.

13. A composition according to claim 1, wherein the composition exhibits a rheological Critical Strain value greater than zero and less than about 0.5 and an Elastic Modulus value greater than zero and less than about 400 Pascals.

14. A composition according to claim 1, wherein the elastomeric surface comprises a vinyl, leather, rubber or synthetic plastic surface.

15. A composition according to claim 1, wherein the elastomeric surface comprises an automotive surface selected from vinyl interior surfaces, leather interior surfaces and exterior rubber surfaces.

16. A composition according to claim 1 which has no emulsifying agent apart from the silicone wetting agent.

17. A composition according to claim 16 wherein the emulsifying agent is a surfactant apart from the silicone wetting agent.

* * * * *